United States Patent
Nakashima

(10) Patent No.: US 7,734,978 B2
(45) Date of Patent: Jun. 8, 2010

(54) COMMUNICATION METHOD ENABLING USE OF BOTH A NORMAL ACKNOWLEDGEMENT SCHEME AND A BLOCK ACKNOWLEDGEMENT SCHEME

(75) Inventor: Ken Nakashima, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 781 days.

(21) Appl. No.: 10/582,986

(22) PCT Filed: Dec. 9, 2004

(86) PCT No.: PCT/JP2004/018412

§ 371 (c)(1),
(2), (4) Date: Jun. 15, 2006

(87) PCT Pub. No.: WO2005/060198

PCT Pub. Date: Jun. 30, 2005

(65) Prior Publication Data

US 2007/0162813 A1 Jul. 12, 2007

(30) Foreign Application Priority Data

Dec. 18, 2003 (JP) .............................. 2003-420303

(51) Int. Cl.
*G08C 25/02* (2006.01)
*H04L 1/18* (2006.01)
(52) U.S. Cl. .................. 714/748; 370/338; 370/395.53
(58) Field of Classification Search .................. 714/748
See application file for complete search history.

(56) References Cited

U.S. PATENT DOCUMENTS

2005/0111416 A1* 5/2005 Ginzburg .................... 370/338
2005/0135284 A1* 6/2005 Nanda et al. ................ 370/294

FOREIGN PATENT DOCUMENTS

JP 07-123079 A 5/1995
WO WO-03/028314 A1 4/2003

OTHER PUBLICATIONS

IEEE P802.11e/D6.0, Nov. 2003 (Draft Amendment to IEEE Std 802.11, 1999 Edition (Reaff2003)) © 2003 IEEE pp. 84-89.
"Part 11: Wireless LAN Medium Access Control (MAC) and Physical Layer (PHY) Specifications" ANSI/IEEE Std 802.11, 1999 Edition pp. 83-84.

* cited by examiner

*Primary Examiner*—Sam Rizk
(74) *Attorney, Agent, or Firm*—Birch, Stewart, Kolasch & Birch, LLP

(57) ABSTRACT

A receiver capable of switching between a NormalAck scheme that includes an acknowledgement for a single frame in one frame and a BlockAck scheme that includes an acknowledgement for a plurality of frames in one frame. The receiver regards the use of the BlockAck scheme to have been terminated and releases resource being used for the BlockAck scheme and switches to the NormalAck scheme if a data frame requesting the BlockAck scheme is not received within a predetermined period regardless of whether the receiving station has or has not received a data frame requesting the NormalAck scheme.

16 Claims, 14 Drawing Sheets

FIG. 8
CONVENTIONAL ART
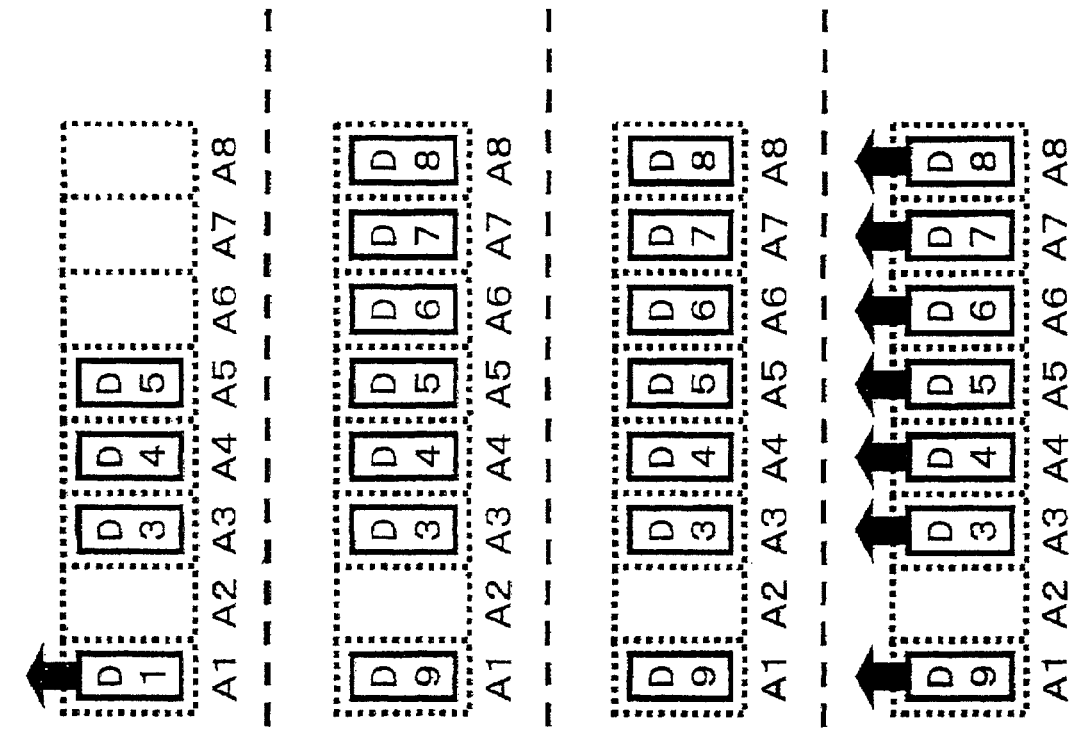
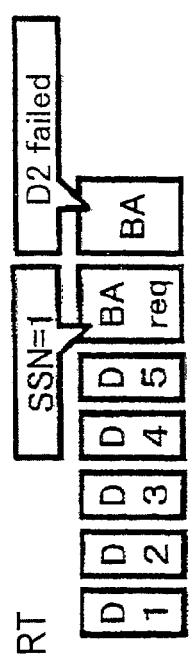
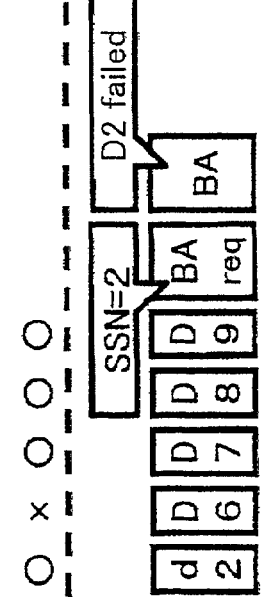
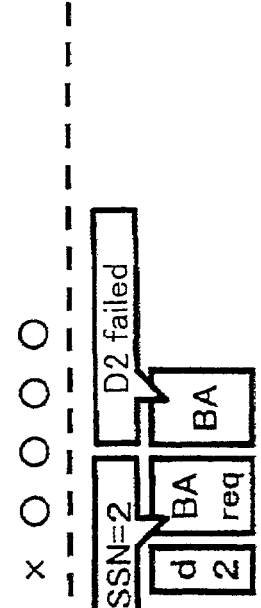
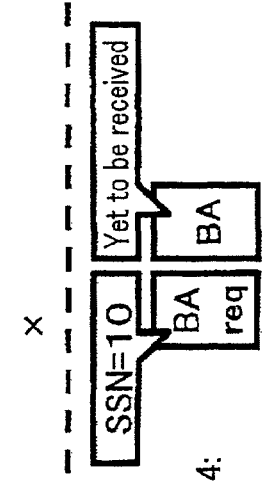
Phase 1:
Phase 2:
Phase 3:
Phase 4:

COMMUNICATION METHOD ENABLING USE OF BOTH A NORMAL ACKNOWLEDGEMENT SCHEME AND A BLOCK ACKNOWLEDGEMENT SCHEME

TECHNICAL FIELD

The present invention relates to a communications method enabling simultaneous use of both a Normal Ack scheme whereby an acknowledgement for one frame is returned in one frame and a Block Ack scheme whereby acknowledgements for a plurality of frames are returned together in one frame.

DISCLOSURE OF INVENTION

For error-free data delivery over wireless communications and like networks where channels are prone to high error ratio, conventional protocols specify that a retransmission process be performed for data frames which were not properly transmitted. The frame receiving station returns to the transmitting station acknowledgement information which indicating whether it has successfully received a frame. The transmitting station detects frames which were not properly received from the acknowledgement information returned from the receiving station so that it can retransmits those frames to the receiving station.

There are two widely known techniques for the transmitting station to obtain acknowledgement information from the receiving station:

The first technique sends back an acknowledgement for one frame in one frame. This is more commonly used than the second technique below.

The other technique sends acknowledgements for a plurality of frames together in one frame.

The former is termed a Normal Ack scheme, and the latter a Block Ack scheme. The Block Ack requires fewer frames to send acknowledgement information and thus uses bandwidth more efficiently than the Normal Ack. The Block Ack however suffers from longer average transmission delays, which is a tradeoff.

Work is under way to establish the IEEE 802.11e standard as an additional set of specifications to the IEEE 802.11 standard in order to realize QoS (Quality of service). The IEEE 802.11 standard (ANSI/IEEE Std. 802.11, 1999 Edition) is popularly known as a standard for the MAC layer (Medium Access Control Layer) in the wireless LAN (Local Area Network).

The current draft for the standard issued by the IEEE 802.11 committee (Draft Amendment to STANDARD [for] Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements, IEEE P802.11e/D6.0, November 2003) specifies a Normal Acknowledgement scheme ("NormalAck scheme") as the Normal Ack scheme and a Block Acknowledgement scheme ("BlockAck scheme") as the Block Ack scheme.

(TID and Sequence Number)

In IEEE 802.11e, each data series is identified by a number called a TID (traffic identifier).

A Sequence Number (a term used in IEEE 802.11) is assigned to the data frame belonging to a TID. The Sequence Number is incremented by 1 for each frame transmission from the transmitting station. Thus, the transmitting/receiving stations can uniquely identify the frame from a combination of a TID and a Sequence Number. In an actually frame, the field which contains a Sequence Number has a finite length. If frames are successively transmitted, numbers are used up, which forces the numbering to start from 0 again. For convenience of discussion, however, it is assumed that such an event does not happen in the present invention.

(NormalAck Scheme)

The NormalAck scheme will be described which is specified in the current draft.

In the NormalAck scheme, the transmitting station transmits one frame, and the receiving station returns acknowledgement information in one frame. Data frames are sequentially transmitted in ascending order of the Sequence Number.

The following is the rules of the NormalAck scheme for a data frame transmission.

<Step 1>

The transmitting station transmits a data frame.

<Step 2>

Upon a successful receipt of the data frame, the receiving station returns a NormalAck frame to the transmitting station.

<Step 3A>

The transmitting station receives the NormalAck frame from the receiving station, which concludes a successful transmission.

<Step 3B>

If the transmitting station has not received a NormalAck frame within a particular period (termed Ack Timeout in IEEE 802.11) after the data frame transmission in step 1, the transmitting station retransmits the same data frame with the same Sequence Number.

<Step 3C>

If the retransmission of a specific data frame fails a particular number of times (termed Retry Limit in IEEE 802.11) or if a predetermined period (termed, for example, Delay Bound or Lifetime in IEEE 802.11e) elapses after the start of the data frame transmission, the frame is regarded as having expired. The transmission is a failure. When this is the case, the data frame is no longer retransmitted.

In the NormalAck scheme, data frames are sequentially transmitted in ascending order of the Sequence Number. The transmitting station is not allowed to transmit a data frame before acknowledgement information is obtained for valid data frame with smaller Sequence Numbers.

(Concrete Example of NormalAck Scheme)

The series of steps from a (re)transmission of a data frame from the transmitting station to a transmission of a NormalAck frame for the data frame from the receiving station are called a phase.

Specific communications using the NormalAck scheme will be described in reference to FIG. 6.

The figure shows successful/failed frame transmissions over a channel on the left and on the right, a buffer and the transfer of the frame to the upper layer in the receiving station. In the figure, "NA" stands for NormalAck frame. Both "Dn" and "dn" indicate a data frame with Sequence Number n, Dn for the data frame in the first transmission, and dn for the data frame in a retransmission. A "O" below the data frame indicates that the frame has been correctly received by the receiving station. An "X" indicates that the frame has not been correctly received by the receiving station. The broken line rectangles show the reception buffer in the receiving station. The NormalAck scheme involves only one reception buffer. If the broken line rectangle contains Dn, it means that the received data frame is contained in the reception buffer. If the broken line rectangle is empty, it means that the reception buffer is empty. If the broken line rectangle contains an up arrow, it means that the data frame contained in the buffer in the receiving station has been passed to the upper layer. As the upper layer receives the data frame, the data frame is erased from the buffer; the buffer is ready for other use.

<Phase 1>

The transmitting station transmits data frame D1. The receiving station does not receive the data frame. The receiving station cannot return a NormalAck frame. The buffer contains nothing.

<Phase 2>

After the transmission of data frame D1 in phase 1, the Ack Timeout elapses without receiving a NormalAck frame. So, the transmitting station retransmits D1. Since that is a retransmitted frame, the figure shows "d1." The receiving station successfully receives the data frame. The receiving station therefore places it in the buffer and immediately passes it to the upper layer and returns a NormalAck frame. The transmitting station however does not receive the NormalAck frame.

<Phase 3>

After the retransmission of data frame D1 in phase 2, the Ack Timeout elapses without receiving a NormalAck frame. So, the transmitting station retransmitted D1. Since the receiving station has already received data frame D1 in phase 2 and passed it to the upper layer, it discards the received data frame D1 without placing again in the buffer or passing it to the upper layer. The receiving station returns a NormalAck frame. In this phase, the transmitting station succeeds in receiving the NormalAck frame.

<Phase 4>

Since the transmitting station has successfully received the NormalAck frame for D1 in phase 3, it transmits a next data frame D2.

(BlockAck Scheme)

In BlockAck-based data transmissions, the receiving station returns acknowledgement information collectively. The receiving station therefore does not receive data frames in the order of their Sequence Numbers. The data however needs to be arranged back to the original order before being passed to the upper layer. The receiving station needs a buffer for this purpose. BlockAck-based communications require this additional buffer resource when compared to the NormalAck scheme. BlockAck-based communications are therefore optional in IEEE 802.11e. The standard specifies that the buffer size in the receiving station can vary depending on the actual buffer mounted in the device. For these reasons, before a BlockAck-based transmission, a BlockAck setup must be made in both the transmitting and receiving stations by exchanging information on their performance between them. Now, BlockAck-based communication procedures will be described in reference to FIG. 5.

A transmitting station 501 and a receiving station 502 interactively perform a BlockAck initiation process (termed an ADDBA process in IEEE 802.11e). In an ADDBA process, the transmitting station and the receiving station first agree to using a BlockAck. To use the BlockAck scheme, the receiving station 502 needs to notify the transmitting station 501 of the reception buffer size. The two stations, in the ADDBA process, notify each other of the reception buffer size in the form of the number of frames that can be received (termed the buffer size in IEEE 802.11e).

As the preparation for a BlockAck transmission is completed, the transmitting station 501 transmits data frames to the receiving station 502. After transmitting some data frames, the transmitting station 501 transmits a BlockAck request frame (termed a BlockAckReq frame in IEEE 802.11e), if necessary, to request an acknowledgement for a plurality of data frames.

Upon receipt of the BlockAck request frame, the receiving station 502 returns a BlockAck frame including the acknowledgement for the data frames to the transmitting station 501.

Data frames are transmitted by repeating steps (2), (3) above. After that, if either one of the stations wants to terminate the BlockAck-based data communications, the station initiates a BlockAck termination process. If the transmitting station 501 is to terminate the BlockAck-based data communications, for example, the transmitting station 501 sends a "terminate BlockAck" message to the receiving station 502. After the BlockAck-based data communications is terminated, the stations perform communications using the ordinary NormalAck scheme.

The operation steps of the BlockAck scheme will be now described.

<Step 1>

The data passed from the upper layer to the transmitting station is divided as necessary for a transmission in data frames. Unlike the NormalAck scheme where an Ack frame is returned for every data frame transmission, some data frames are successively transmitted.

<Step 2>

The transmitting station transmits a BlockAckReq frame to the receiving station as necessary when the transmitting station wants to know if the successively transmitted data frames have been received by the receiving station. The BlockAckReq frame contains the Sequence Number of the first frame the receiving status of which the transmitting station wants to check with the receiving station (termed the Starting Sequence Number in IEEE 802.11e).

<Step 3>

Upon receiving the BlockAckReq frame, the receiving station returns a BlockAck frame. The BlockAck frame contains individual information for each Sequence Number as to whether the frame has been successfully received. The BlockAck frame also contains information indicating whether the data frames which have been received so far and bear either the Starting Sequence Number or any Sequence Numbers after that have been successfully received.

<Step 4>

Upon receiving the BlockAck frame, the transmitting station retransmits the data frames which are indicated in the BlockAck frame as not having been received by the receiving station and also transmits new data frames. In the NormalAck scheme, the data frames must be transmitted in ascending order of their Sequence Numbers. In contrast, the BlockAck scheme provides greater freedom as to in which order valid data frames must be retransmitted. In other words, even if the transmitting station is yet to obtain acknowledgement information for a data frame which is still valid for a retransmission, the station is allowed to transmit a data frame with a larger Sequence Number. The transmitting station may on purpose alter the order in which the data frames are transmitted because of, for example, relationship between the remaining time given to the transmitting station to complete transmission and the time actually needed to transmit the data frames.

Nevertheless, in this situation, a rule dictates that the transmitting station does not transmit data frames beyond the number of frames that the receiving station can store in the buffer. The transmitting station is notified of the buffer size of the receiving station in the BlockAck initiation process. More specifically, if the transmitting station is yet to receive an Ack for the valid data frame with Sequence Number n, the transmitting station is not allowed to transmit data frames with Sequence Numbers n plus the buffer size and beyond. "Valid" indicates that the frame is yet to expire for a retransmission.

If the retransmission count for a data frame has reached the Retry Limit or if the Delay Bound has elapsed, the transmitting station gives up retransmitting the data frame and transmits data frames with following Sequence Numbers.

In the NormalAck scheme, if a NormalAck frame has not been received normally by the transmitting station as in phase 2 in FIG. 6, the transmitting station quite often retransmits a frame which is already received by the receiving station. However, in the BlockAck scheme, the transmitting station rarely does so, because if the transmitting station transmits a BlockAckReq frame without receiving a BlockAck frame, the station typically retransmits the BlockAckReq frame until it receives the BlockAck frame.

The current draft specifies two timings for the receiving station to return a BlockAck frame: immediate BlockAck policy and delayed BlockAck policy. According to immediate BlockAck policy, a BlockAck frame is returned immediately upon the receipt of a BlockAckReq frame. According to delayed BlockAck policy, a NormalAck frame is first returned upon the receipt of a BlockAckReq frame. Thereafter, a BlockAck frame is returned when the receiving station has obtained a transmission right. It does not matter in the present invention whether either of the policies is employed. No detailed description is given here as to differences between the two policies. The present invention is applicable to both policies. In the following, however, we assume that immediate BlockAck policy is employed.

As mentioned above, in the BlockAck scheme, data frames are not necessarily received in the order of their Sequence Numbers. This creates a need to reorder the frames in the receiving station. In other words, if there is a data frame X which is yet to be received, the receiving station must temporarily store the data frames with larger Sequence Numbers than X in the reception buffer. After receiving the data frame X, the receiving station passes the data frames with larger Sequence Numbers to the upper layer in the order of the Sequence Numbers. Since each data frame has a time limit for a retransmission, it is not guaranteed that the data frame X is surely received later, if not now. If the transmitting station gives up retransmitting the data frame X because it is no longer valid, and if the receiving station does not know that, the receiving station cannot transfer the data frames with Sequence Numbers beyond X to the upper layer forever. Accordingly, to transfer valid data frames, the BlockAck scheme uses the Starting Sequence Number of the BlockAckReq frame. This use of the Starting Sequence Number is governed by the following rules.

<Rule 1>

The Starting Sequence Number indicates the value of the Sequence Number of the first of the data frames for which the transmitting station requests acknowledgement information from the receiving station. Therefore, the data frames with smaller Sequence Numbers than the Starting Sequence Number are those the retransmission of which the transmitting station has given up because they are no longer valid. Upon receiving a BlockAckReq frame, the receiving station can transfer to the upper layer all the successfully received data frames with smaller Sequence Numbers than the Starting Sequence Number.

(BlockAck Timeout)

As is apparent from the foregoing description, the BlockAck scheme necessitates a buffer resource to reorder the data frames back to their original sequence. When the BlockAck scheme is terminated, the transmitting station and the receiving station usually explicitly carry out a BlockAck termination process in an interactive fashion. The receiving station can therefore release the buffer resource from the BlockAck scheme. However, if the transmitting station has disappeared unexpectedly, the resource which has been allocated for the BlockAck scheme in the receiving station is not released for other processes.

To prevent this from happening, IEEE 802.11e includes specifications on BlockAck connection timeout. If a data frame or a BlockAckReq frame, for example, which belongs to the TID using BlockAck is not received for a particular period (termed BlockAck Timeout) while the BlockAck scheme is being used, the receiving station is allowed to regard the BlockAck connection as having been terminated and release the resource from the BlockAck connection.

(BlockAck Scheme, Concrete Example 1)

A concrete example of a retransmission process in the BlockAck scheme will be described in reference to FIG. 7.

In the BlockAck scheme, the series of steps from a (re) transmission of a plurality of data frames through a transmission of a BlockAckReq frame, both from the transmitting station, to a transmission of a BlockAck frame from the receiving station called a phase.

In FIG. 7, BA indicates a BlockAck frame, and BA req indicates a BlockAckReq frame. In the BlockAck scheme, the reception buffer is adapted to contain a plurality of data frames. Am indicates an address in the reception buffer. An Am rectangle contains Dn, it means that buffer address Am contains a received frame. If an Am rectangle is empty, it means that buffer address Am is empty. If an Am rectangle contains an up arrow, it means that the data frame contained in the buffer in the receiving station has been passed to the upper layer from the MAC layer. Otherwise, the same notation is used as in FIG. 6 in relation to the NormalAck scheme. Description is not repeated here.

Suppose that the transmitting station is notified through advance processing that the buffer size of the receiving station is 8.

<Phase 1>

In phase 1, the transmitting station transmits data frames D1 to D5 and a BlockAckReq frame. The receiving station places successfully received D1, D3, D4, D5 in the buffer. Among them, D1 alone is passed to the upper layer, which empties buffer address A1. Since D2 has not been received, the receiving station cannot pass D3 and subsequent data frames to the upper layer, leaving them in the buffer. From the BlockAck frame returned from the receiving station, the transmitting station knows that the receiving station has not received D2.

<Phase 2>

In response to the BlockAck frame from the receiving station, the transmitting station retransmits D2 in phase 2. Since the data frames up to D5 were transmitted in the preceding phase, the transmitting station transmits D6 and subsequent data frames. Now that the receiving station has successfully received D2, the empty buffer address in the preceding phase is filled up. The data frames up to D5 are passed to the upper layer, emptying buffer addresses A2 to A5. D6 is not successfully received. D6 and subsequent data frames are not passed to the upper layer. D1 was passed to the upper layer immediately after being received in the preceding phase. Buffer address A1 was therefore empty, and is now reused to store D9. The receiving station returns a BlockAck frame to notify the transmitting station that it has not received D6 and D8.

<Phase 3>

In response to the BlockAck frame from the receiving station, the transmitting station retransmits D6 and D8 in phase 3. Since the data frames up to D9 were transmitted in the preceding phase, the transmitting station transmits D10 and subsequent data frames. Since D6 is successfully received, and D8 is not, the receiving station passes D6 and D7 to the upper layer, leaving buffer addresses A6 and A7 empty. The receiving station returns a BlockAck frame to notify the transmitting station that it has not received D8.

<Phase 4>

In response to the BlockAck frame from the receiving station, the transmitting station retransmits D8 in phase 4. Since the data frames up to D12 were transmitted in the preceding phase, the transmitting station transmits D13 and subsequent data frames. So far, the transmitting station has not obtained acknowledgement information for valid data frame D8. Since the transmitting station was notified that the buffer size of the receiving station is 8 in advance, the transmitting station knows that the receiving station does not have enough buffer to store D16. The transmitting station therefore suspends the transmission of new data frames after D15 and transmits a BlockAckReq frame. The receiving station successfully receives D8, but not D14. D8 to D13 are passed to the upper layer, emptying all the buffer addresses to the exclusion of A7.

(BlockAck Scheme, Concrete Example 2)

A concrete example of BlockAck-based communications is shown in FIG. 8 where the transmitting station gives up retransmission before a data frame is successfully transmitted. The Starting Sequence Number of the BlockAckReq frame is used to indicate the time limit for retransmission of a data frame. The figure identifies the Starting Sequence Number by an abbreviation SSN. Otherwise, the same notation is used as in Concrete example 1 of the BlockAck scheme. Description is not repeated here.

For the sake of simplicity, suppose in the following description that the BlockAckReq frame and the BlockAck frame are always successfully received.

Suppose also that the transmitting station is notified through advance processing that the buffer size of the receiving station is 8.

<Phase 1>

In phase 1, the transmitting station transmits data frames D1 to D5 and a BlockAckReq frame. The receiving station places successfully received D1, D3, D4, D5 in the buffer. Among them, D1 alone is passed to the upper layer, which empties buffer address A1. The receiving station returns a BlockAck frame to notify the transmitting station that it has not received D2.

<Phase 2>

In response to the BlockAck frame from the receiving station, the transmitting station retransmits D2 in phase 2. Also, the transmitting station transmits D6 and subsequent data frames. So far, the transmitting station has not obtained acknowledgement information for D2. Also, D2's retransmission time limit has not been reached yet. Therefore, the transmitting station sets the Starting Sequence Number in the BlockAckReq frame to 2. All the buffer addresses are used except for A2 which is to receive D2. To put it differently, D3 and the subsequent data frames, although successfully received, cannot be passed to the upper layer. The receiving station returns a BlockAck frame to notify the transmitting station that it has again not received D2.

<Phase 3>

In response to the BlockAck frame from the receiving station, the transmitting station retransmits D2 in phase 3. However, the transmitting station has not obtained acknowledgement information for valid data frame D2. Since the buffer size of the receiving station is 8, the transmitting station can work out that the receiving station does not have enough buffer to store D10. The transmitting station therefore suspends the transmission of subsequent data frames.

In phase 3, the receiving station returns a BlockAck frame to notify that it has again not received D2. Suppose here that D2's retransmission time limit has been reached and that the transmitting station has given up retransmitting D2.

<Phase 4>

The transmitting station knows from the BlockAck frames that the receiving station received data frames D3 to D9 up to the preceding phase. Therefore, the transmitting station transmits a BlockAckReq frame with a Starting Sequence Number 10 and notifies the receiving station that it will not retransmit the data frames with Sequence Number 9 or less. Accordingly, the receiving station passes D3 to D9 which were received up to the preceding phase so as to clear all the buffer addresses. The transmitting station can transmit data frames D10 to D17 in a next phase.

(Switching from BlockAck Scheme to NormalAck Scheme)

The BlockAck scheme normally has higher bandwidth efficiency than the NormalAck scheme. When there are only a few data frames to be covered by a BlockAckReq frame, however, the NormalAck scheme is more efficiency than the BlockAck scheme. For these reasons, data communications belonging to a TID which is set up to use the BlockAck scheme through a ADDBA process are allowed to switch temporarily to the NormalAck scheme for improved bandwidth efficiency.

Each data frame contains a field termed an Ack Policy field which indicates whether the data frame is to be transmitted in the NormalAck scheme or in the BlockAck scheme. In a data transmission belonging to a TID which is set up to use a BlockAck, the NormalAck scheme can be used if the Ack Policy field of a data frame specifies the NormalAck scheme.

For example, in phase 3 in FIG. 8, no data frames other than D2 can be transmitted. In cases like this, the transmission station can obtain acknowledgement situation for D2 more quickly using a sequence "d2-NormalAck frame" than a sequence "d2-BlockAckReq frame-BlockAck frame."

In cases like this, for example, the transmitting station is allowed to include information indicating the NormalAck scheme in the Ack Policy field of D2 in phase 3 in FIG. 8. By so doing, the receiving station is notified that D2 should be processed according to the NormalAck scheme. These actions are illustrated in FIG. 9.

In FIG. 9, suppose that the receiving station successfully receives D2 in phase 3. In phase 3, the receiving station can pass D2 to D9 to the upper layer to clear all the buffers.

In phase 4 and onwards in FIG. 9, the transmitting station can obtain acknowledgement information for a plurality of data frames. Thus, the transmitting station includes information indicating the BlockAck scheme in the Ack Policy fields of the data frames.

The current specifications give no criteria as to under which conditions a switch should be made from the BlockAck scheme to the NormalAck scheme.

(Issue 1)

As described above, the transmitting station is allowed to use a NormalAck policy-based data frame transmission for a BlockAck-scheme TID data series for improved bandwidth efficiency. The current specifications however do not mention in which order data frames should be transmitted in accordance with the NormalAck policy. The data frames transmitted in the NormalAck scheme used here is a time-saving substitution of data frames which by the nature of the case should be transmitted in the BlockAck scheme. Considering this, both the transmitting and receiving stations would presumably behave in accordance with the following BlockAck scheme rules.

<Rules on Transmitting Station>

Even before acknowledgement information is obtained for a valid data frame, the transmitting station is allowed to transmit data frames with larger Sequence Numbers. The transmitting station may possibly alter on purpose the order in which data frames are transmitted because of, for example, relationship between the time given to the transmitting station to complete transmission and the time actually needed to transmit the data frames. If the transmitting station is yet to receive an Ack for the valid data frame with Sequence Number n, the transmitting station is not allowed to transmit data frames with Sequence Numbers n plus the buffer size and beyond. "Valid" indicates that the frame is yet to expire for a retransmission.

<Rules on Receiving Station>

When there is a data frame X (Sequence Number=x) which has not been successfully received, the receiving station is not allowed to pass data frames with larger Sequence Numbers than x to the upper layer. Upon receiving a BlockAckReq frame with a Starting Sequence Number y (>x), the receiving station is allowed to pass the received data with Sequence Numbers between x and y to the upper layer.

The BlockAckReq frame is not transmitted while the transmitting station is using NormalAck. A problem here is that if the transmitting station has given up retransmitting a particular frame, the receiving station has no way of knowing it.

An example of the occurrence of Issue 1 will be described in reference to FIG. 10.

FIG. 10 illustrates procedures implemented when the transmission is switched from the BlockAck scheme to the NormalAck scheme and there are two data frames to be transmitted.

As shown in FIG. 10, the transmitting station transmits data frames in the BlockAck scheme in phases 1 and 2. The receiving station notifies the transmitting station in a BlockAck frame that it has not received data frames D2 and D5 in phases 1 and 2.

As a response to the receiving station having not received data frames D2 and D5 in phases 1 and 2, the transmitting station switches from the BlockAck scheme to the NormalAck scheme in phase 3. The transmitting station then transmits data frame D2 in the NormalAck scheme in phases 3 through n. The receiving station does not receive data frame D2 in all the phases.

Upon the end of phase n, the transmitting station knows that D2 has expired for a retransmission and gives up retransmitting D2. Therefore, in next phase n+1, the transmitting station transmits, in the NormalAck scheme, data frame D5 which was not received in phases 1 and 2. The receiving station, in phase n+1, succeeds in receiving data frame D5, but does not know that the transmitting station has given up retransmitting data frame D2. Thus, D2 and subsequent data frames cannot be passed to the upper layer. This is Issue 1.

Also, there are no specifications on the length of time during which the transmitting station temporarily uses the NormalAck scheme before coming back to the BlockAck scheme. If the transmitting station uses the NormalAck scheme for too long, delay grows in the receiving station knowing that unreceived data frames are no longer valid. This in turn causes delay to grow in the receiving station passing the normally received subsequent data frames to the upper layer.

When the transmitting station ends BlockAck-based data communications and switches to the NormalAck scheme, the transmitting station normally notifies the receiving station in a separate message that it will end the BlockAck scheme. This notification message itself however has a retransmission time limit. If the receiving station does not receive the notification message within the retransmission time limit, the receiving station may not be explicitly notified that the transmitting station have completely switched to the NormalAck scheme. Problems here are the same as those mentioned above which occur if the transmitting station uses the "temporary" NormalAck scheme for too long.

(Issue 2)

As explained above, if the transmitting station has ended a BlockAck scheme-based data transmission and completely switched to the NormalAck scheme, but without the receiving station being explicitly notified of it, the receiving station continues to receive data frames from the transmitting station according to the NormalAck scheme.

The current draft specifies that no matter what Ack Policy is currently chosen, a decision is made as to timeout for a BlockAck-based connection in accordance with whether the receiving station has received data which belongs to a TID which is set up to use the BlockAck scheme. Therefore, timeout is not detected in the situation above. The receiving station cannot release the resource from the BlockAck scheme forever. This is Issue 2.

An example of the occurrence of Issue 2 will be described in reference to FIG. 11.

FIG. 11 illustrates the receipt and transmission of frames and the readings of a timer used for the detection of BlockAck Timeout in the receiving station. Suppose that the receiving station regards the BlockAck scheme as having ended when it detects, on the timer, that the BlockAckTimeout derived from the BlockAckReq frame has been reached. Tn is a timing when the timer is reset to default value.

Dn is the data frame with Sequence Number n, dn the data frame with Sequence Number n in a retransmission, BAreq a BlockAckReq frame, and BA a BlockAck frame. A single line enclosure around data frames Dn and dn indicates that the frame has been transmitted in BlockAck scheme Ack Policy. A double lines enclosure indicates that the frame has been transmitted in NormalAck scheme Ack Policy.

Actually, the timer should be started upon the completion of an ADDBA process, which is however omitted here.

In FIG. 11, the transmitting station switches to the NormalAck scheme while a frame is still being transmitted in the BlockAck scheme. The transmitting station transmits to the receiving station a message indicating that the BlockAck scheme is to be ended. Suppose that the receiving station does not correctly received the message within the retransmission time limit of the message. According to the current draft, no matter what Ack Policy is currently chosen, the timer is reset every time a data frame is received. Therefore, although the transmitting station has ended the BlockAck scheme and switched to the NormalAck scheme, the receiving station cannot detect an end of the BlockAck scheme. The timer is reset at T4 to T10 in FIG. 11. These re-settings prevent the timer from reaching BlockAck Timeout. The receiving station cannot release the resource from the BlockAck scheme.

DISCLOSURE OF THE INVENTION (Means to Solve Issue 1)

To solve Issue 1 above, the communications method in accordance with the present invention adds the following two rules.

<Additional Rule 1>

If the transmitting station transmits a data frame with Sequence Number x in the NormalAck scheme during BlockAck scheme-based communications, it means that the data frames with Sequence Numbers before x are no longer valid for retransmission. Hence, the transmitting station must transmit data frames with Sequence Numbers y (<x) before transmitting the data frame with Sequence Number x in the NormalAck scheme.

<Additional Rule 2>

If the receiving station receives a data frame specifying the NormalAck scheme in its Ack Policy field during BlockAck scheme-based communications, it means that all the successfully received data frames with smaller Sequence Numbers than that of the data frame can be passed to the upper layer.

(Means to Solve Issue 2)

To solve Issue 2 above, the communications method in accordance with the present invention detects BlockAck Timeout according to any of the following rules.

<Alternative Rule 1>

If the receiving station does not receive a data frame specifying the BlockAck scheme in its Ack Policy field within the period of BlockAck Timeout during BlockAck scheme-based communications, the receiving station is allowed to regard the BlockAck scheme as being no longer in use and release the resource from the BlockAck scheme.

<Alternative Rule 2>

If the receiving station does not receive a BlockAckReq frame within the period of BlockAck Timeout during BlockAck scheme-based communications, the receiving station is allowed to regard the BlockAck scheme as being no longer in use and release the resource from the BlockAck scheme.

<Alternative Rule 3>

If the receiving station dose not receive a BlockAckReq frame or a data frame specifying the BlockAck scheme in its Ack Policy field within the period of BlockAck Timeout during BlockAck scheme-based communications, the receiving station is allowed to regard the BlockAck scheme as being no longer in use and release the resource from the BlockAck scheme.

(Means to Solve Issue 1 in More Detail)

A transmitting station in accordance with the present invention is compliant with a communications method whereby a data frame is numbered with a predetermined Sequence Number before transmission. The method simultaneously involves both the NormalAck scheme and the BlockAck scheme in the receiving station returning an Ack for the data frame. After the transmitting station transmits a data frame with a Sequence Number in the NormalAck scheme, it does not transmit a data frame with an older Sequence Number.

A receiving station in accordance with the present invention is compliant with a communications method whereby a data frame is numbered with a predetermined Sequence Number before transmission. The method simultaneously involves both the NormalAck scheme and the BlockAck scheme in the receiving station returning an Ack for the data frame. Upon receipt of a data frame requesting the use of the NormalAck scheme, the receiving station passes, to the upper layer, the data frames with older Sequence Numbers than that of the data frame requesting the use of the NormalAck scheme which are already received, but yet to be passed to the upper layer.

A communications method in accordance with the present invention numbers a data frame with a predetermined Sequence Number before transmission and allows the receiving station to simultaneously use both the NormalAck scheme and the BlockAck scheme in returning an Ack for the data frame. If the transmitting station transmits data frames with Sequence Numbers in the NormalAck scheme, the transmitting station does not transmit data frames with older Sequence Number than the Sequence Numbers. Upon receiving a data frame requesting the NormalAck scheme, the receiving station passes to the upper layer those data frames which have been already received, but are yet to be passed to the upper layer, the data frames having older Sequence Numbers than the Sequence Number of the data frame requesting the NormalAck scheme.

Another communications method in accordance with the present invention is compliant with the IEEE 802.11 standard (ANSI/IEEE Std. 802.11, 1999 Edition) and the Draft IEEE 802.11e standard (IEEE P802.11e/D6.0, November 2003). If the transmitting station of a stream of a TID transmits a QoS data frame with a Sequence Number including an Ack Policy field containing information indicating NormalAck, the transmitting station does not transmit a QoS data frame with a smaller Sequence Number than the Sequence Number. If the receiving station of a stream of a TID receives a QoS data frame including an Ack Policy field containing information indicating NormalAck, the receiving station passes to the upper layer those QoS data frames which have been already received, but are yet to be passed to the upper layer, the QoS data frames having smaller Sequence Numbers than the Sequence Number of the received QoS data frame.

These methods solve the issue that if the transmitting station has temporarily switched to the NormalAck scheme while using the BlockAck scheme and is taking too long a time to switch back to the BlockAck scheme, the receiving station can know that an unreceived data frames is no longer valid with growing delay, and hence the receiving station can pass subsequent normally received data frames to the upper layer with growing delay.

(Means to Solve Issue 2 in More Detail)

A receiving station in accordance with the present invention is compliant with a communications method which simultaneously involves both the NormalAck scheme and the BlockAck scheme in the receiving station returning an Ack for a received data frame. If the receiving station does not receive a data frame requesting the BlockAck scheme within a predetermined period regardless of whether the receiving station has or has not received a data frame requesting the NormalAck scheme, the receiving station regards the use of the BlockAck scheme as having been terminated and releases the resource being used for the BlockAck scheme.

A communications method in accordance with the present invention allows the receiving station to simultaneously use both the NormalAck scheme and the BlockAck scheme in returning an Ack for a received data frame. If the receiving station does not receive a data frame requesting the BlockAck scheme within a predetermined period regardless of whether the receiving station has or has not received a data frame requesting the NormalAck scheme, the receiving station is allowed to regard the use of the BlockAck scheme as having been terminated and release the resource being used for the BlockAck scheme.

Another receiving station in accordance with the present invention is compliant with a communications method which simultaneously involves both the NormalAck scheme and the BlockAck scheme in the receiving station returning an Ack for a received data frame. If the receiving station does not receive a BlockAck request frame within a predetermined period regardless of whether the receiving station has or has not received a data frame, the receiving station regards the use of the BlockAck scheme as having been terminated and releases the resource being used for the BlockAck scheme.

Another communications method in accordance with the present invention allows the receiving station to simultaneously use both the NormalAck scheme and the BlockAck scheme in returning an Ack for a receive data frame. If the receiving station does not receive a BlockAck request frame within a predetermined period regardless of whether the receiving station has or has not received a data frame, the receiving station is allowed to regard the use of the BlockAck scheme as having been terminated and release the resource being used for the BlockAck scheme.

Another receiving station in accordance with the present invention is compliant with a communications method which simultaneously involves both the NormalAck scheme and the BlockAck scheme in the receiving station returning an Ack for a received data frame. If the receiving station does not receive a data frame requesting the BlockAck scheme or a BlockAck request frame within a predetermined period regardless of whether the receiving station has or has not received a data frame, the receiving station regards the use of the BlockAck scheme as having been terminated and releases the resource being used for the BlockAck scheme.

Another communications method in accordance with the present invention allows the receiving station to simultaneously use both the NormalAck scheme and the BlockAck scheme in returning an Ack for a received data frame. If the receiving station does not receive a data frame requesting the BlockAck scheme or a BlockAck request frame within a predetermined period regardless whether the receiving station has or has not received a data frame, the receiving station is allowed to regard the use of the BlockAck scheme as having been terminated and release the resource being used for the BlockAck scheme.

Another communications method in accordance with the present invention is compliant with the IEEE 802.11 standard (ANSI/IEEE Std. 802.11, 1999 Edition) and the Draft IEEE 802.11e standard (IEEE P802.11e/D6.0, November 2003). If the receiving station of a stream of a TID does not receive a QoS data frame including an Ack Policy field containing information indicating BlockAck within the period of BlockAck Timeout regardless of whether the receiving station has or has not received a QoS data frame including an Ack Policy field containing information indicating NormalAck, the receiving station is allowed to release the resource being used for transmission of the BlockAck.

Another communications method in accordance with the present invention is compliant with the IEEE 802.11 standard (ANSI/IEEE Std. 802.11, 1999 Edition) and the Draft IEEE 802.11e standard (IEEE P802.11e/D6.0, November 2003). If the receiving station of a stream of a TID does not receive a Block Acknowledgement Request Frame within the period of BlockAck Timeout regardless whether the receiving station has or has not received a QoS data frame, the receiving station is allowed to release the resource being used for transmission of the BlockAck.

Another communications method in accordance with the present invention is compliant with the IEEE 802.11 standard (ANSI/IEEE Std. 802.11, 1999 Edition) and the Draft IEEE 802.11e standard (IEEE P802.11e/D6.0, November 2003). If the receiving station of a stream of a TID does not receive a QoS data frame including an Ack Policy field containing information indicating BlockAck or a Block Acknowledgement Request Frame within the period of BlockAck Timeout regardless of whether the receiving station has or has not received a QoS data frame including an Ack Policy field containing information indicating NormalAck, the receiving station is allowed to release the resource being used for transmission of the BlockAck.

These methods solve the issue that when the transmitting station is to terminate BlockAck-based data communications to switch to the NormalAck scheme, the receiving station cannot detect timeout to release the resource from the BlockAck scheme forever if the receiving station does not correctly receive a message transmitted from the transmitting station to the receiving station which indicates that "the BlockAck scheme be terminated" within a retransmission time limit of the message.

A communications program in accordance with the present invention describes procedures which a computer undergoes to operate as the transmitting station in the foregoing method.

Another communications program in accordance with the present invention describes procedures which a computer undergoes to operate as the receiving station in the foregoing method.

A computer-readable storage medium containing a computer program in accordance with the present invention contains the forgoing communications program.

BRIEF DESCRIPTION OF DRAWINGS

FIG. 8 illustrates a second concrete example of process procedures for a BlockAck scheme according to a conventional communications method (a d2 retransmission has been given up).

BEST MODE FOR CARRYING OUT INVENTION

The following will describe the present invention in further detail by way of examples and comparative examples, which is by no means limiting the present invention.

Figure 5:
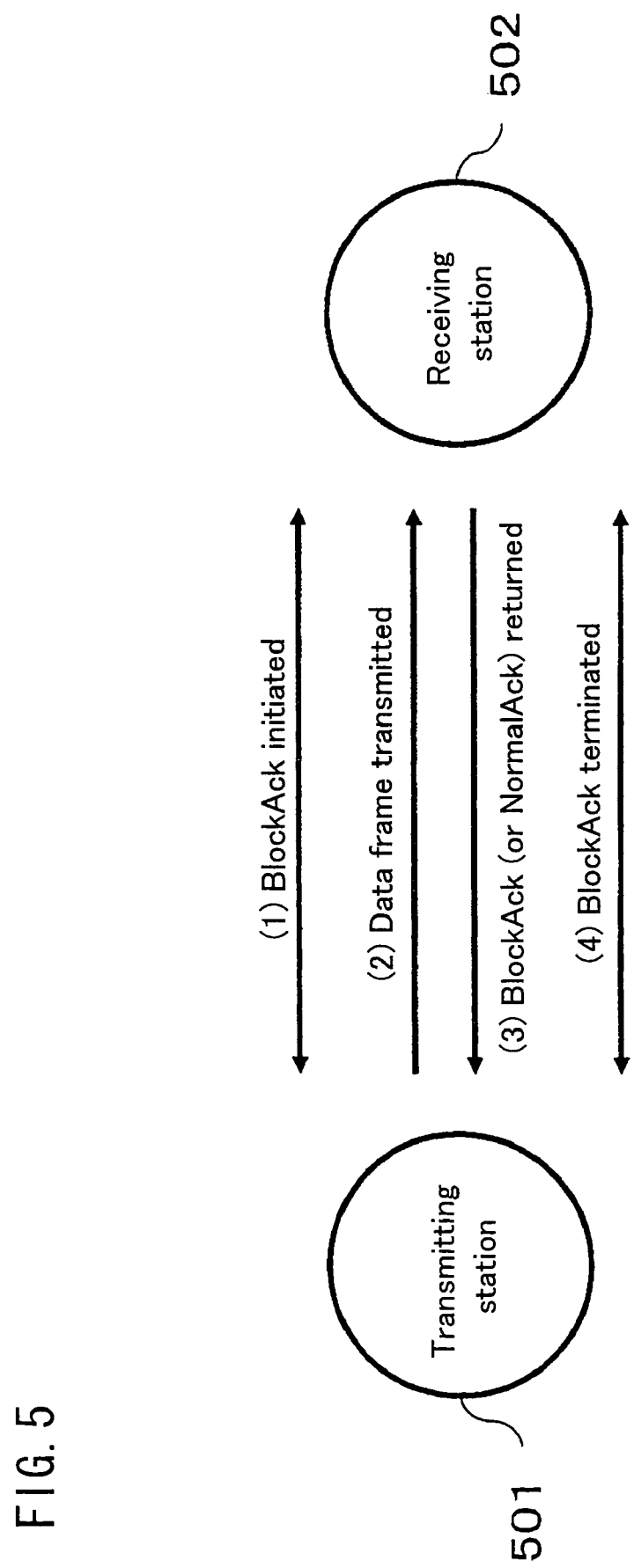
FIG. 5 illustrates the outline of communications procedures by a BlockAck scheme according to the conventional communications method and the communications method of the present invention.
Figure 6:
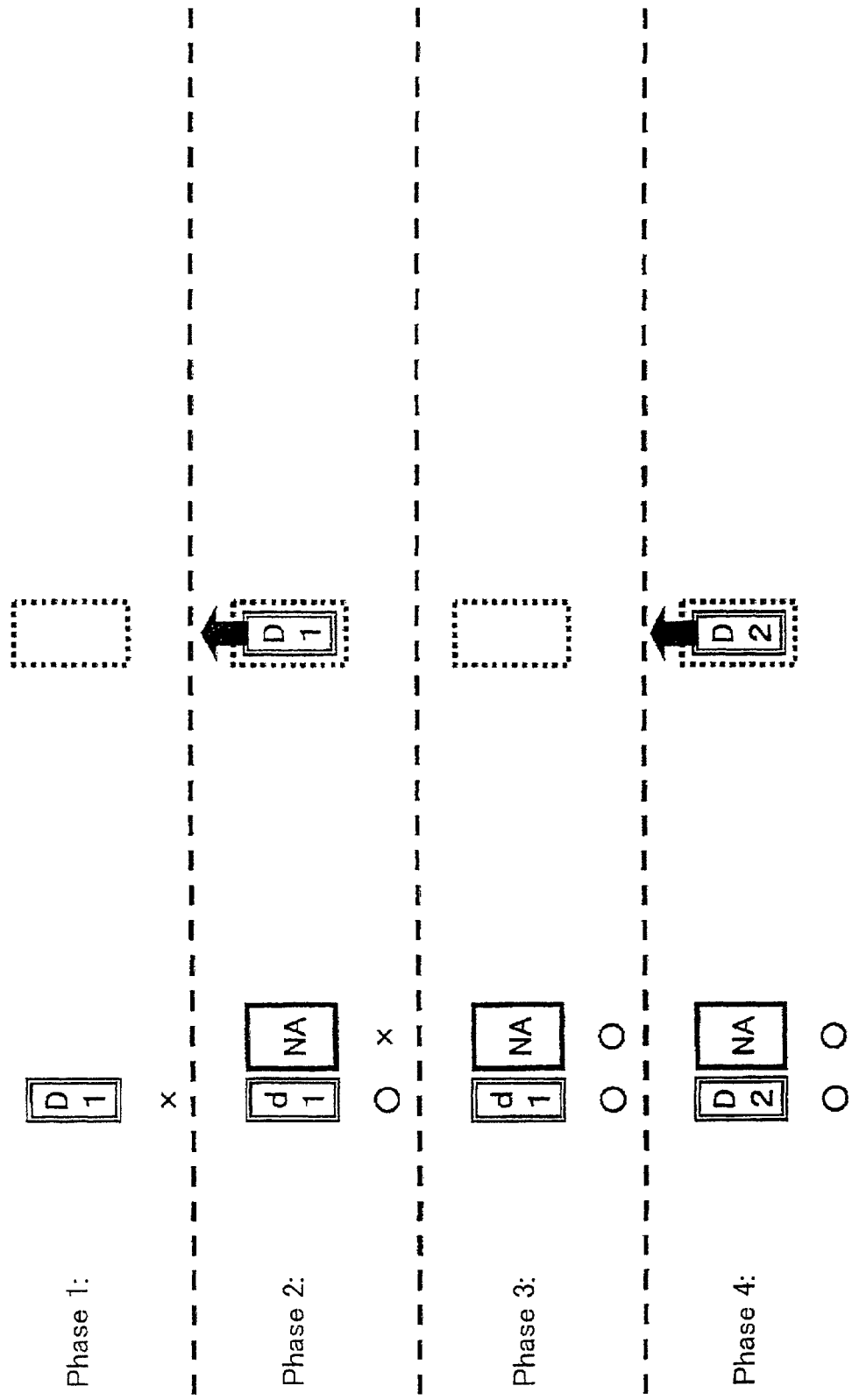
FIG. 6 illustrates a concrete example of process procedures for a NormalAck scheme according to a conventional communications method (a NormalAck frame is not properly received).
Figure 7:
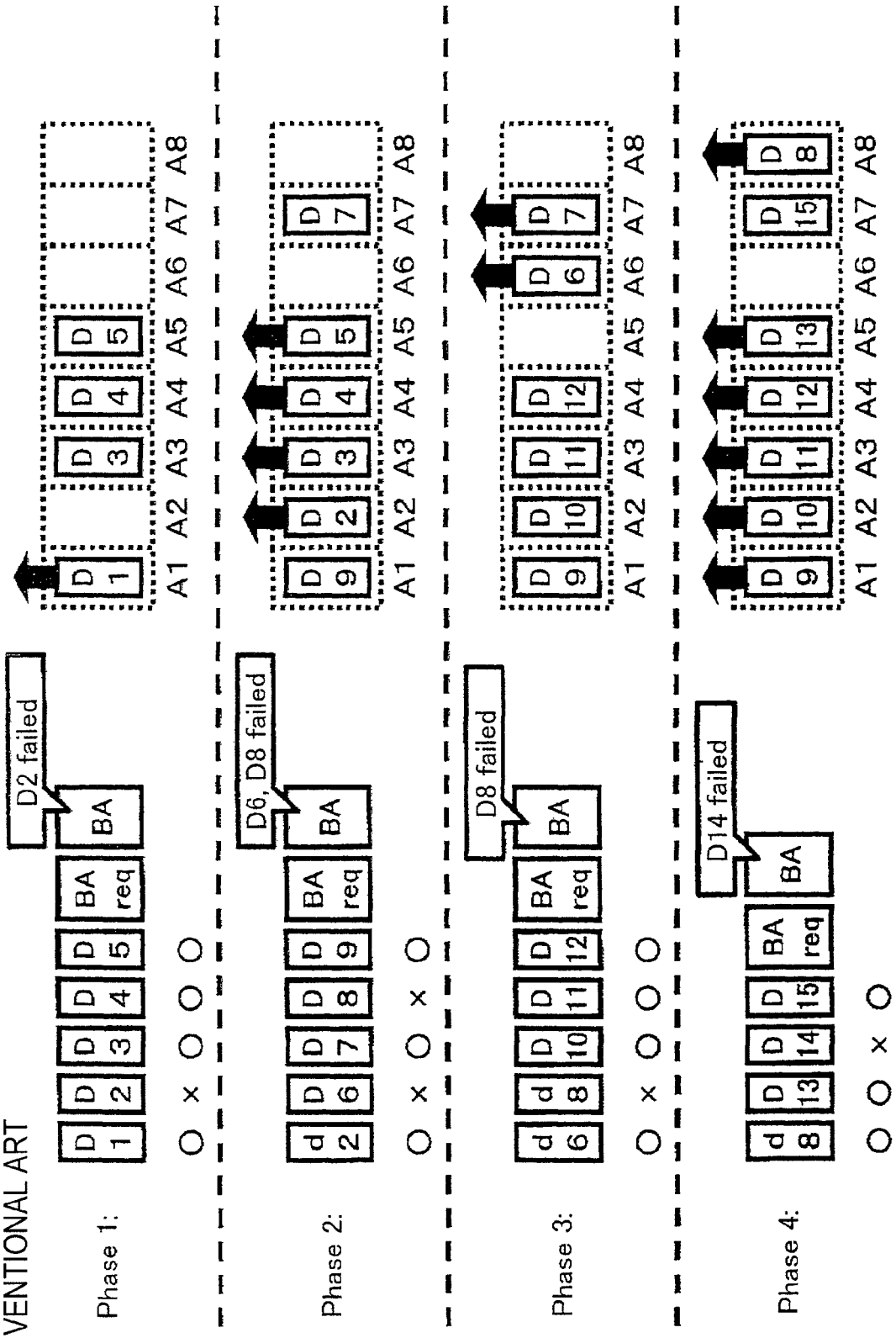
FIG. 7 illustrates a first concrete example of process procedures for a BlockAck scheme according to a conventional communications method (a retransmission has completed)
Figure 9:
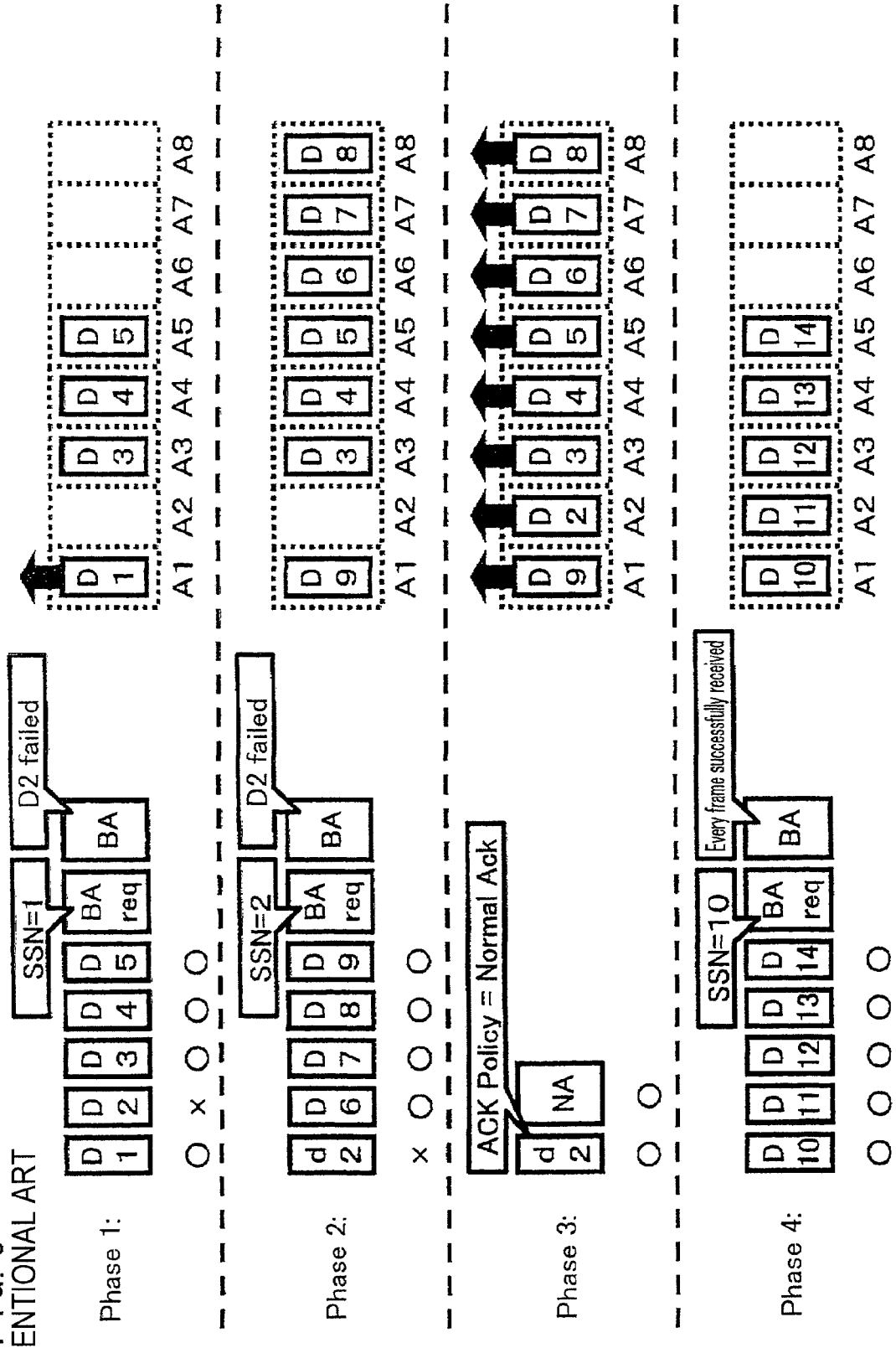
FIG. 9 illustrates process procedures implemented when a conventional communications method switches from a BlockAck scheme to a NormalAck scheme (there is one data frame to be transmitted).
Figure 10:
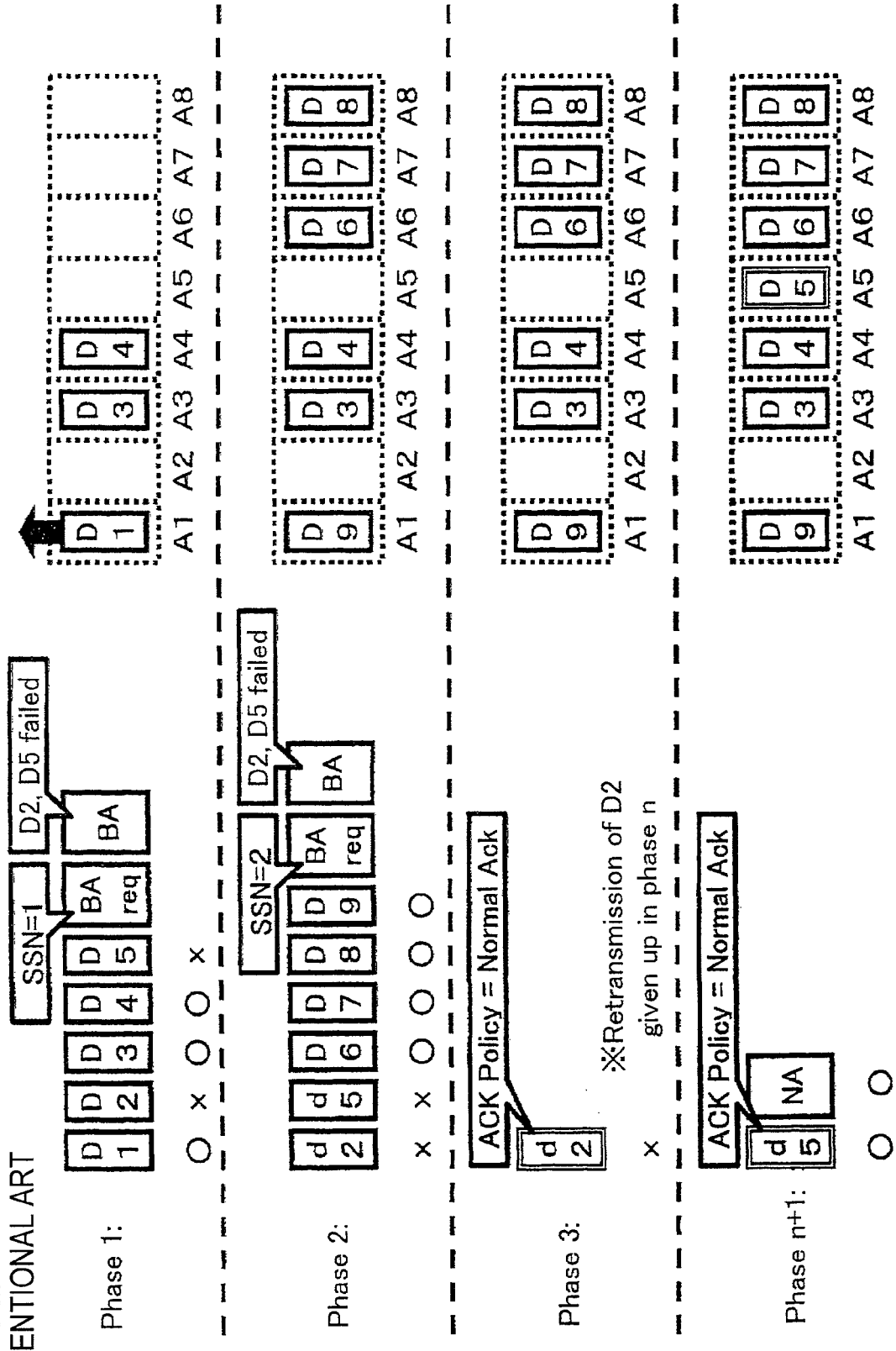
FIG. 10 illustrates process procedures implemented when a conventional communications method switches from a BlockAck scheme to a NormalAck scheme (there are two data frames to be transmitted).

The BlockAck scheme in the following embodiment involves similar setup procedures to conventional cases, which are shown in FIG. 5.

The following will present examples of the present invention being applied to a communications method in compliance with the current drafts for the IEEE 802.11 and IEEE 802.11e standards. The present invention is applicable also to other communications methods.

Embodiment 1

Figure 1:
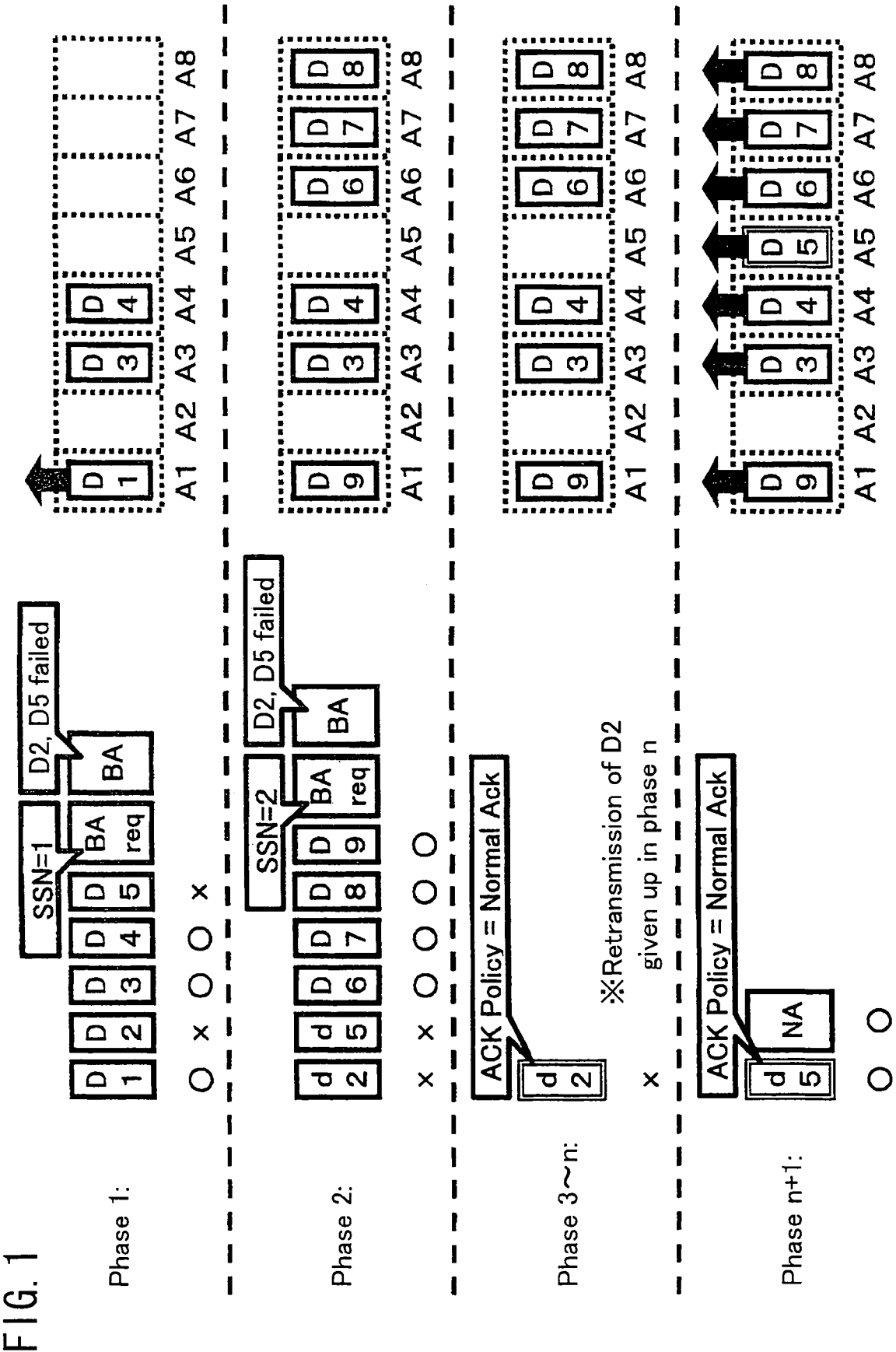
FIG. 1 illustrates process procedures in accordance with embodiment 1 of the present invention.

Embodiment 1 of the present invention will be described in reference to FIGS. 1, 12, and 13. Embodiment 1 presents an exemplary solution to Issue 1.

Figure 12:
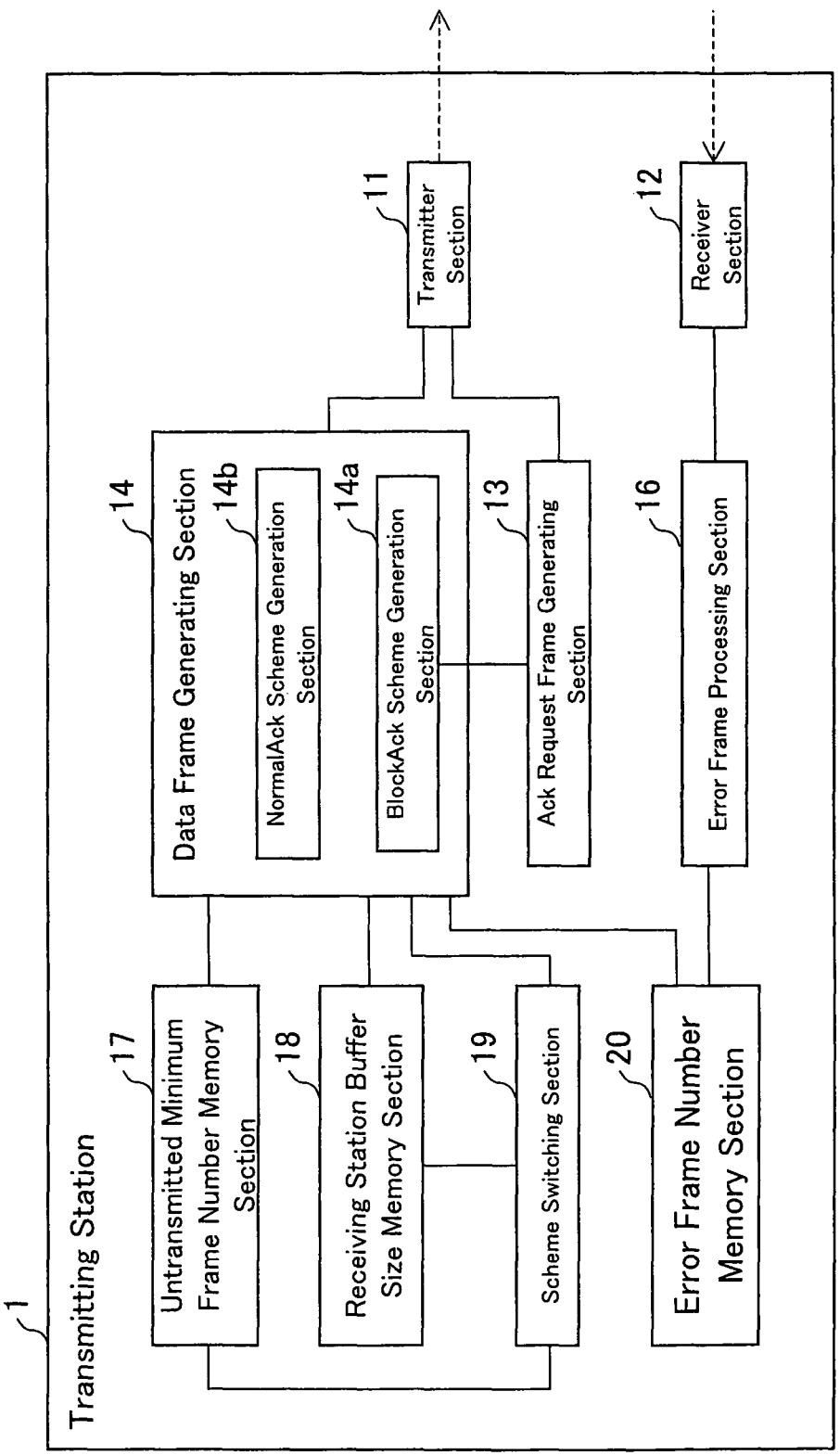
FIG. 12 is a block diagram illustrating the configuration of a transmitting station in accordance with embodiment 1 of the present invention.

FIG. 12 is a block diagram illustrating the configuration of a transmitting station 1 of the present embodiment. The transmitting station 1 divides, for example, stream data into a plurality of data frames and transmits the divided data frames to a receiving station.

Referring to FIG. 12, the transmitting station 1 includes a transmitter section 11, a receiver section 12, an Ack request frame generating section 13, a data frame generating section 14, an error frame processing section 16, an untransmitted minimum frame number memory section 17, a receiving station buffer size memory section 18, an Ack scheme switching section 19, and an error frame number memory section 20.

The transmitter section 11 transmits various frames to the receiving station. For example, the transmitter section 11 transmits the receiving station data frames generated in the data frame generating section 14 and a BlockAckReq frame generated in the Ack request frame generating section 13.

The receiver section 12 receives various frames from the receiving station. For example, the receiver section 12 receives a BlockAck frame and a NormalAck frame from the receiving station. The receiver section 12 sends an incoming BlockAck frame and an incoming NormalAck frame to the error frame processing section 16.

The receiving station buffer size memory section 18 contains a BlockAck-scheme buffer size on the receiving station. A receiving station buffer size write section (not shown) writes, to the receiving station buffer size memory section 18, the buffer size of which the transmitting station 1 is notified by the receiving station during the aforementioned BlockAck initiation process (ADDBA process) implemented between the transmitting station 1 and the receiving station.

The untransmitted minimum frame number memory section 17 contains an untransmitted minimum frame number which is a minimum one of the Sequence Numbers of untransmitted data frames. The untransmitted minimum frame number in the untransmitted minimum frame number memory section 17 is updated by the data frame generating section 14.

The error frame number memory section 20 contains an error frame number, which is the Sequence Number of a frame which the receiving station has not received (error frame). The error frame number in the error frame number memory section 20 is updated by the error frame processing section 16.

The Ack scheme switching section 19 switches the frame transmission/reception scheme between the BlockAck scheme and the NormalAck scheme. The Ack scheme switching section 19 provides information indicating an Ack scheme type after switching, that is, either the BlockAck scheme or the NormalAck scheme, to the data frame generating section 14.

There are no particular limitations on a criterion in the Ack scheme switching by the Ack scheme switching section 19. In the present embodiment, as an example, the Ack scheme switching section 19 selects the BlockAck scheme initially. The Ack scheme switching section 19 switches from the BlockAck scheme to the NormalAck scheme if a next, untransmitted data frame cannot be transmitted in BlockAck scheme data communications.

Furthermore, the Ack scheme switching section 19 is capable of determining, based on the untransmitted minimum frame number contained in the untransmitted minimum frame number memory section 17, the buffer size contained in the receiving station buffer size memory section 18, and the error frame number contained in the error frame number memory section 20, that an untransmitted data frame cannot be transmitted in a next frame transmission. As mentioned earlier, in the BlockAck scheme, data frames cannot be transmitted which have Sequence Numbers greater than or equal to a minimum Sequence Number of the error frame numbers (n) plus the buffer size (for example, 8). This is because of the lack of empty space in the reception buffer to store data frames in the receiving station. Therefore, if the sum of the minimum Sequence Number of the error frame numbers contained in the error frame number memory section 20 and the buffer size contained in the receiving station buffer size memory section 18 is equal to the untransmitted minimum frame number contained in the untransmitted minimum frame number memory section 17, the Ack scheme switching section 19 determines that an untransmitted data frame cannot be transmitted in a next frame transmission, switching from the BlockAck scheme to the NormalAck scheme.

The data frame generating section 14 generates data frames for transmission to the receiving station. The data frame generating section 14 includes a BlockAck scheme generation section 14a which generates data frames in the BlockAck scheme and a NormalAck scheme generation section 14b which generates data frames in the NormalAck scheme.

The BlockAck scheme generation section 14a operates when it receives Ack scheme indicating information indicating the BlockAck scheme from the Ack scheme switching section 19. The BlockAck scheme generation section 14a generates data frames with "BlockAck scheme" in the Ack Policy field. The BlockAck scheme generation section 14a generates data frames to be transmitted in one phase, based on the untransmitted minimum frame number contained in the untransmitted minimum frame number memory section 17, the buffer size contained in the receiving station buffer size memory section 18, and the error frame number contained in the error frame number memory section 20. As mentioned earlier, in the BlockAck scheme, a phase refers to the process starting with a (re)transmission of a plurality of data frames from the transmitting station 1, followed by a transmission of a BlockAckReq frame, and ending with a transmission of a BlockAck frame from the receiving station in response.

The BlockAck scheme generation section 14a supplies the generated data frames to the transmitter section 11. Accordingly, the transmitter section 11 transmits data frames which should be transmitted in one phase in a successive manner.

In addition, after the transmitter section 11 transmits the data frames, the BlockAck scheme generation section 14a outputs, to the Ack request frame generating section 13, the transmitted minimum frame number, which is a minimum Sequence Number of the data frames transmitted in one phase.

Further, if a data frame previously untransmitted is transmitted, the BlockAck scheme generation section 14a updates the untransmitted minimum frame number in the untransmitted minimum frame number memory section 17.

Suppose, for example, an untransmitted minimum frame number, 6; a buffer size, 8; and an error frame numbers, 2, 5. Under such circumstances, the BlockAck scheme generation section 14a generates data frames D2, D5, as well as untransmitted data frames D6, D7, D8, D9 with Sequence Numbers less than the sum "10" of the minimum error frame number "2" and the buffer size "8" as data frames to be transmitted in one phase and sends them to the transmitter section 11. The BlockAck scheme generation section 14a then outputs the transmitted minimum frame number "2," which is a minimum Sequence Number of the transmitted data frames, to the Ack request frame generating section 13.

The NormalAck scheme generation section 14b is a functional block activated when it receives the Ack scheme indicating information indicating the NormalAck scheme from the Ack scheme switching section 19. The NormalAck scheme generation section 14b generates data frames with "NormalAck scheme" in the Ack Policy field.

When the error frame number memory section 20 contains an error frame number, the NormalAck scheme generation section 14b generates a single data frame corresponding to that error frame number. If the error frame number memory section 20 contains a plurality of error frame numbers, the NormalAck scheme generation section 14b generates a single data frame corresponding to a minimum Sequence Number of those error frame numbers.

In contrast, if the error frame number memory section 20 contains no error frame numbers, the NormalAck scheme generation section 14b generates a single data frame corresponding to the untransmitted minimum frame number contained in the untransmitted minimum frame number memory section 17. Similarly to the above-mentioned BlockAck scheme generation section 14a, if a data frame previously untransmitted is transmitted, the NormalAck scheme generation section 14b updates the untransmitted minimum frame number in the untransmitted minimum frame number memory section 17.

The NormalAck scheme generation section 14b sends the generated single data frame to the transmitter section 11. Accordingly, the transmitter section 11 transmits one data frame in one phase.

In this manner, the NormalAck scheme generation section 14b generates a data frame corresponding to a minimum Sequence Number of the error frame numbers contained in the error frame number memory section 20 and the untransmitted minimum frame numbers contained in the untransmitted minimum frame number memory section 17. Therefore, after the NormalAck scheme generation section 14b transmits a data frame with a Sequence Number via the transmitter section 11, the BlockAck scheme generation section 14a and the NormalAck scheme generation section 14b transmits no data frames with Sequence Numbers less than that Sequence Number.

Based on the BlockAck frame or NormalAck frame received by the receiver section 12, the error frame processing section 16 writes to the error frame number memory section 20 an error frame number corresponding to the data frame which the receiving station has not received. In addition, if the error frame number memory section 20 contains a frame number corresponding to the data frame which the receiving station has successfully received, the error frame processing section 16 erases the frame number from the error frame number memory section 20.

Further, the error frame processing section 16 erases, from the error frame number memory section 20, the data frames for which attempts of retransmission has failed a predetermined number of times (m times) and the frame numbers corresponding to the data frames for which a predetermined time has elapsed after the first transmission attempt. Accordingly, expired data frames are never retransmitted.

If the Ack scheme switching section 19 has selected the BlockAck scheme, and an expired data frame which has not been successfully received occurs, the error frame processing section 16 outputs an Ack request frame generation command signal to the Ack request frame generating section 13.

If the Ack scheme switching section 19 has selected the BlockAck scheme, the Ack request frame generating section 13 generates a BlockAckReq frame and sends the generated BlockAckReq frame to the transmitter section 11. The Ack request frame generating section 13 receives the transmitted minimum frame number from the BlockAck scheme generation section 14a and the Ack request frame generation command signal from the error frame processing section 16.

If the Ack request frame generating section 13 has received the transmitted minimum frame number from the BlockAck scheme generation section 14a, the section 13 generates a BlockAckReq frame by setting its Starting Sequence Number to the received transmitted minimum frame number.

In contrast, if the Ack request frame generating section 13 has received the Ack request frame generation command signal from the error frame processing section 16, the section 13 generates a BlockAckReq frame by setting its Starting Sequence Number to the untransmitted minimum frame number contained in the untransmitted minimum frame number memory section 17. Accordingly, as shown in FIG. 8, the receiving station comes to know that the data frames with Sequence Numbers less than the Starting Sequence Number are not retransmitted.

Next, a receiving station 5 of the present embodiment will be described in terms of its configuration. FIG. 13 is a block diagram illustrating the configuration of the receiving station 5.

Figure 13:
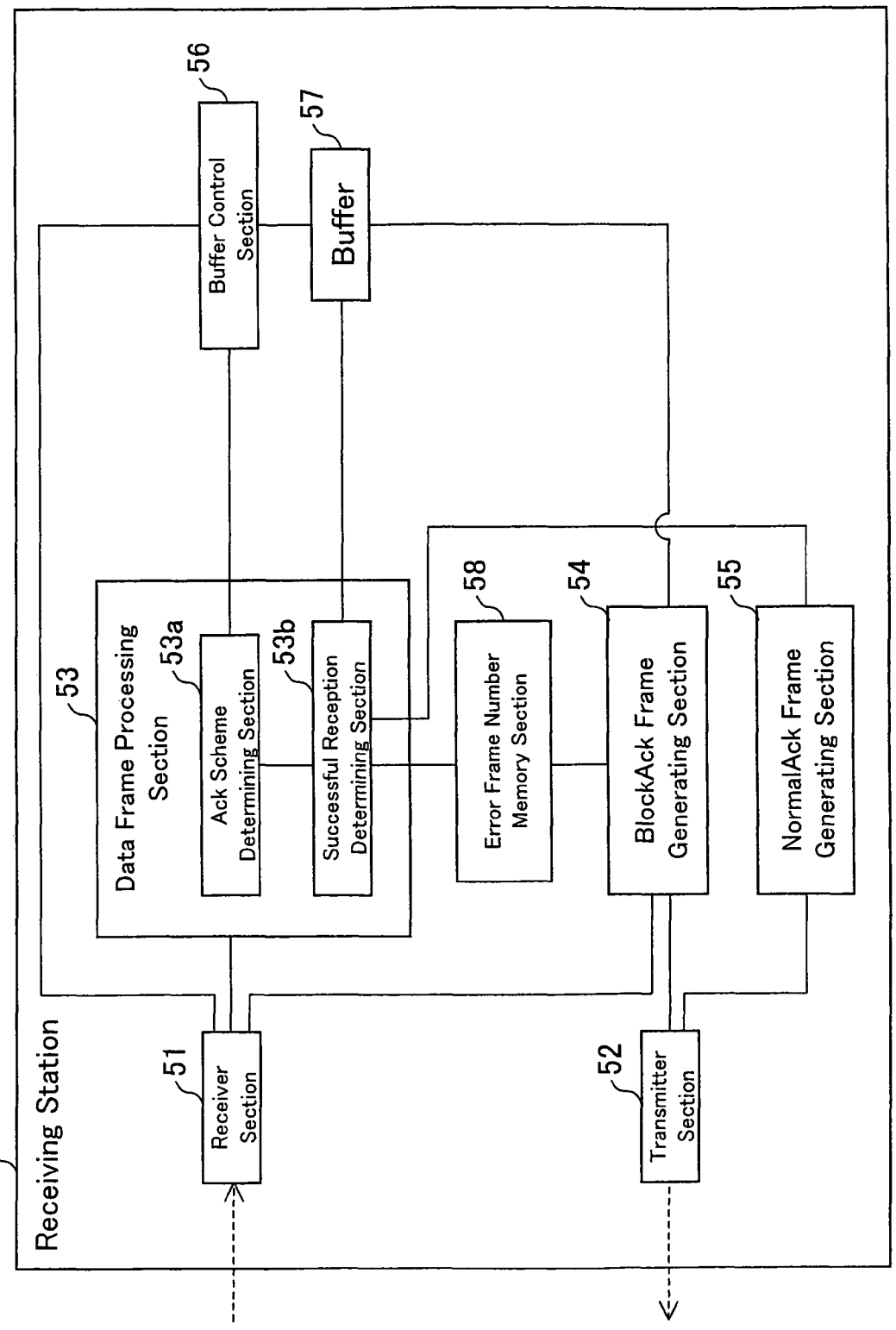
FIG. 13 is a block diagram illustrating the configuration of a receiving station in accordance with embodiment 1 of the present invention.

As shown in FIG. 13, the receiving station 5 includes a receiver section 51, a transmitter section 52, a data frame processing section 53, a BlockAck frame generating section 54, a NormalAck frame generating section 55, a buffer control section (buffer control means) 56, a buffer 57, and an error frame number memory section 58.

The receiver section 51 receives various frames from the transmitting station 1. For example, the receiver section 51 receives data frames and a BlockAckReq frame in the BlockAck scheme and the NormalAck scheme. Upon receiving a data frame in the BlockAck scheme or the NormalAck scheme, the receiver section 51 outputs the received data frame to the data frame processing section 53. In addition, upon receiving a BlockAckReq frame, the receiver section 51 outputs the BlockAckReq frame to the buffer control section 56 and the BlockAck frame generating section 54.

The data frame processing section 53 includes an Ack scheme determining section 53a and a successful reception determining section 53b.

The Ack scheme determining section 53a identifies the Ack scheme for received data frames. The Ack scheme determining section 53a determines from the Ack Policy field of a data frame whether the data frame should be handled according to the BlockAck scheme or in the NormalAck scheme.

If the received data frame should be handled according to the NormalAck scheme, the Ack scheme determining section 53a outputs the Sequence Number of the data frame to the buffer control section 56.

The successful reception determining section 53b determines from, for example, an error detection code in the received data frame whether or not the data frame has been successfully received. The successful reception determining section 53b stores a successfully received data frame to the buffer 57.

If the Ack scheme determining section 53a has determined that the received data frame should be handled according to the BlockAck scheme, the successful reception determining section 53b stores a Sequence Number corresponding to the data frame which is not received successfully in one phase as an error frame number to the error frame number memory section 58.

In contrast, if the Ack scheme determining section 53a has determined that the received data frame should be handled according to the NormalAck scheme, the successful reception determining section 53b outputs receipt status information indicating whether or not the data frame has been successfully received to the NormalAck frame generating section 55.

The BlockAck frame generating section 54 receives the BlockAckReq frame from the receiver section 51 and generates a BlockAck frame for output to the transmitter section 52.

The BlockAck frame generating section 54 compares the Starting Sequence Number contained in the BlockAckReq frame to a maximum one of the Sequence Numbers of the data frames in the buffer 57.

if the Starting Sequence Number is less than or equal to a maximum one of the Sequence Numbers of the data frames in the buffer 57, the BlockAck frame generating section 54 reads error frame numbers greater than or equal to the Starting Sequence Number from the error frame number memory section 58. The BlockAck frame generating section 54 then generates a BlockAck frame indicating that the data frames with the error frame number readouts have not been received successfully. At the same time, the BlockAck frame generating section 54 erases the error frame numbers less than the Starting Sequence Number from the error frame number memory section 58.

In contrast, if the Starting Sequence Number is greater than the maximum one of the Sequence Numbers of the data frames in the buffer 57, the BlockAck frame generating section 54 generates a BlockAck frame indicating that the data frame corresponding to the Starting Sequence Number has not been received. Meanwhile, the BlockAck frame generating section 54 erases the error frame numbers less than the Starting Sequence Number from the error frame number memory section 58.

If the NormalAck frame generating section 55 has received, from the successful reception determining section 53b, receipt status information which indicates whether or not a data frame has been successfully received, and the receipt status information indicates that the data frame has been successfully received, the section 55 generates a NormalAck frame for output to the transmitter section 52. If the receipt status information indicates that the data frame has not been successfully received, the section 55 generates nothing.

The buffer 57 provides temporary storage for data frames received normally by the receiver section 51.

The buffer control section 56 reads a data frame to be passed to an upper layer from the buffer 57, after which the buffer control section 56 erases that data frame from the buffer 57. The buffer control section 56 then passes the data frame readout to the upper layer.

As mentioned earlier, the buffer control section 56 receives the BlockAckReq frame from the receiver section 51 and the Sequence Number from the Ack scheme determining section 53a.

Upon receiving the BlockAckReq frame from the receiver section 51, the buffer control section 56 compares the Starting Sequence Number in the BlockAckReq frame to a maximum one of the Sequence Numbers of the data frames in the buffer 57.

If the Starting Sequence Number is less than or equal to the maximum one of the Sequence Numbers of the data frames in the buffer 57, the buffer control section 56 reads, from the buffer 57, data frames with Sequence Numbers less than the Starting Sequence Number, as well as the data frame corresponding to the Starting Sequence Number and successfully received, successive data frames, to pass the data frames to the upper layer.

In contrast, if the Starting Sequence Number is greater than the maximum one of the Sequence Numbers of the data frames in the buffer 57, the buffer control section 56 reads all the data frames from the buffer 57 to pass them to the upper layer.

Upon receiving the Sequence Number from the Ack scheme determining section 53a, the buffer control section 56 reads, from the buffer 57, data frames with Sequence Numbers less than the received Sequence Number, as well as the data frame with the received Sequence Number and successfully received, successive data frames, to pass them to the upper layer. In other words, the buffer control section 56, upon receiving a data frame requesting a NormalAck scheme, reads data frames with older Sequence Numbers than the Sequence Number of the data frame requesting the NormalAck scheme from the buffer 57 to pass them to the upper layer. The section 56 deletes those data frames from the buffer 57 after the readout.

Next, referring to FIG. 1, a data communications process of the present embodiment as implemented in the transmitting station 1 and the receiving station 5 will be described on a phase-to-phase basis.

Suppose that the buffer size of the receiving station 5 is 8 and it is known to the transmitting station in prior processing. In other words, the receiving station buffer size memory section 18 in the transmitting station 1 contains a buffer size, 8. Suppose also that the error frame processing section 16 in the transmitting station 1 monitors retransmission counts for the data frames; the section 16 erases, from the error frame number memory section 20, the Sequence Number corresponding to a data frame for which m retransmission attempts have failed.

<Phase 1>

In the transmitting station 1 in phase 1, the Ack scheme switching section 19 selects the BlockAck scheme, which is part of the initial setup. The BlockAck scheme generation section 14a generates five data frames, that is, data frames D1 to D5, which is also part of initial setup. The BlockAck scheme generation section 14a stores an untransmitted minimum frame number "6" into the untransmitted minimum frame number memory section 17. The transmitter section 11 then transmits data frames D to D5 to the receiving station 5.

The Ack request frame generating section 13 generates a BlockAckReq frame with a Starting Sequence Number "1." The transmitter section 11 transmits the BlockAckReq frame to the receiving station 5.

In contrast, in the receiving station 5 in phase 1, the successful reception determining section 53b in the data frame processing section 53 determines that only data frames D2 and D5 have not been successfully received. The section 53b stores data frames D1, D3, D4 to the buffer 57 and error frame numbers "2" and "5" to the error frame number memory section 58.

After receiving the above-mentioned BlockAckReq frame, the buffer control section 56 reads data frame D1 which has the same Sequence Number as the Starting Sequence Number from the buffer 57 to pass it to the upper layer, because data frame D2 has not been successfully received. After the readout, the buffer control section 56 erases data frame D1 from the buffer 57.

After receiving the above-mentioned BlockAckReq frame, the BlockAck frame generating section 54 reads error frame numbers "2" and "5" from the error frame number memory section 58 and generates a BlockAck frame indicating that data frames D2 and D5 have not been successfully received. The transmitter section 52 then transmits the BlockAck frame.

After receiving the above-mentioned BlockAck frame, in the transmitting station 1, the error frame processing section 16 stores error frame numbers "2" and "5" to the error frame number memory section 20.

<Phase 2>

Next, in the transmitting station 1 in phase 2, the BlockAck scheme generation section 14a generates data frames D2 and D5 corresponding to the error frame numbers "2" and "5" from those error frame numbers contained in the error frame number memory section 20.

Further, the BlockAck scheme generation section 14a generates data frames D6 to D9 with Sequence Numbers from the untransmitted minimum frame number "6" contained in the untransmitted minimum frame number memory section 17 before the sum "10" of the error frame number "2" and the buffer size "8" contained in the receiving station buffer size memory section 18. The BlockAck scheme generation section 14a updates the untransmitted minimum frame number in the untransmitted minimum frame number memory section 17 to "10."

The transmitter section 11 transmits data frames D2, D5 to D9 to the receiving station 5.

Further, the Ack request frame generating section 13 generates a BlockAckReq frame with a Starting Sequence Number "2." The BlockAckReq frame is transmitted to the receiving station 5 via the transmitter section 11.

In the receiving station 5 in phase 2, the successful reception determining section 53b in the data frame processing section 53 determines that only data frames D2 and D5 have not been successfully received. The section 53 stores data frames D6 to D9 in the buffer 57 and updates the error frame number memory section 58 to error frame numbers "2" and "5."

After receiving the above-mentioned BlockAckReq frame, the buffer control section 56 cannot reads data frame D2 which has the same Sequence Number "2" as the Starting Sequence Number from the buffer 57, because data frame D2 has not been successfully received. That is, the buffer control section 56 reads no data frames from the buffer 57.

After receiving the above-mentioned BlockAckReq frame, the BlockAck frame generating section 54 reads error frame numbers "2" and "5" from the error frame number memory section 58 and generates a BlockAck frame indicating that data frames D2 and D5 corresponding to the error frame number readouts have not been successfully received. The BlockAck frame is transmitted via the transmitter section 52.

In the transmitting station 1 after receiving the BlockAck frame, the error frame processing section 16 updates the error frame number memory section 20 to error frame numbers "2" and "5." Suppose, as described in the foregoing, that the BlockAck scheme is used in phases 1 and 2 and that D2 and D5 were not successfully received in those phases.

<Phase 3>

Next, in the transmitting station 1 in phase 3, the Ack scheme switching section 19 checks that the sum of the minimum Sequence Number "2" contained in the error frame number memory section 20 and the buffer size "8" contained in the receiving station buffer size memory section 18 equals the untransmitted minimum frame number "10" contained in the untransmitted minimum frame number memory section 17 before switching from the BlockAck scheme to the NormalAck scheme.

In response to the Ack scheme switching section 19 having switched to the NormalAck scheme, the NormalAck scheme generation section 14b generates a data frame with "NormalAck scheme" in the Ack Policy field. The NormalAck scheme generation section 14b generates data frame D2 corresponding to a minimum Sequence Number (here, "2") out of the error frame number contained in the error frame number memory section 20 and the untransmitted minimum frame number contained in the untransmitted minimum frame number memory section 17.

The transmitter section 11 transmits data frame D2 with "NormalAck scheme" in the Ack Policy field to the receiving station 5.

In contrast, in to the receiving station 5 in phase 3, the Ack scheme determining section 53a in the data frame processing section 53 determines that the data frame should be handled according to the NormalAck scheme. The successful reception determining section 53b in the data frame processing section 53 determines that data frame D2 has not been successfully received.

The Ack scheme determining section 53a outputs the Sequence Number "2" of the received data frame for the NormalAck scheme to the buffer control section 56. Accordingly, the buffer control section 56 reads data frames with Sequence Numbers less than or equal to the received Sequence Number "2" from the buffer 57 to pass them to the upper layer. In a case like this, since the buffer 57 does not contain data frames with Sequence Numbers less than or equal to the Sequence Number "2," the buffer control section 56 reads no data frames from the buffer 57.

The data frame processing section 53 outputs to the NormalAck frame generating section 55 receipt status information indicating that data frame D2 has not been successfully received. As a result, the receiving station 5 transmits no NormalAck frame.

The transmitting station 1 receives no NormalAck frame; therefore, the error frame number memory section 20 is not updated.

<Phases 4 to n>

Suppose hereinafter that the receiving station 5 always fails to receive data frame D2. By not receiving a NormalAck frame for data frame D2, the error frame processing section 16 in the transmitting station 1 detects in phase n that retransmission attempts have failed m times. The section 16 then erases error frame number "2" from the error frame number memory section 20.

As described in the foregoing, in phase 3, the receiving station 5 notifies the transmitting station 1 through the BlockAck frame that d2 and d5 have not been successfully received. Since D2 has not been successfully received and the buffer size of the receiving station is 8, the transmitting station 1 is able to calculate that a transmission of D10 renders the buffer of the receiving station 5 insufficient. The transmitting station 1 thus comes to know that it can transmit no further data frames and, considering acknowledgement process efficiency, switches from the BlockAck scheme to the NormalAck scheme. Now, the transmitting station 1 must decide whether it should first transmit d2 or d5. Where the IEEE 802.11e standard provides no rules to determine a transmission sequence in this situation, the present invention provides additional rule 1. According to the rule, if d5 is transmitted in the NormalAck scheme, the transmitting station 1 is not allowed thereafter to transmit d2 in the NormalAck scheme. The transmitting station 1 thus decides to transmit d2 first. Thereafter, the transmitting station 1 continues its attempts to retransmit d2 in the NormalAck scheme until phase n is over.

<Phase n+1>

Next, in the transmitting station 1 in phase n+1, the NormalAck scheme generation section 14b generates data frame D5 corresponding to a minimum Sequence Number (here, "5") out of the error frame numbers contained in the error frame number memory section 20 and the untransmitted minimum frame numbers contained in the untransmitted minimum frame number memory section 17.

The transmitter section 11 then transmits data frame D5 with "NormalAck scheme" in its Ack Policy field to the receiving station 5.

In contrast, in the receiving station 5, the Ack scheme determining section 53a in the data frame processing section 53 determines that the data frame should be handled according to the NormalAck scheme. The successful reception determining section 53b in the data frame processing section 53 determines that data frame D5 has been successfully received and stores data frame D5 in the buffer 57.

The Ack scheme determining section 53a outputs the Sequence Number "5" of the received data frame which should be handled according to the NormalAck scheme to the buffer control section 56. Accordingly, the buffer control section 56 reads data frames with Sequence Numbers less than the received Sequence Number "5" (i.e., data frames D3 and D4), data frame D5, and successfully received, successive data frames (i.e., data frames D5 to D9) from the buffer 57 and passes those data frames to the upper layer.

As described in the foregoing, the transmitting station 1 starts retransmission of d5 in the NormalAck scheme in phase n+1 if the transmitting station gives up retransmission of d2 in phase n because, for example, the RetryLimit has reached a predetermined value or the DelayBound for d2 has elapsed.

If d5 is successfully received, the receiving station determines which data frame to be passed to the upper layer. Since the receiving station is yet to receive D2 and a BlockAckReq frame with a Starting Sequence Number greater than or equal to 3, no frames could be passed to the upper layer if the receiving station regarded the NormalAck as a substitution for the BlockAck. According to the present invention, however, additional rule 2 is applicable in this situation; the receiving station comes to know that the transmitting station has given up retransmission of d2. The receiving station can hence pass D3 and D4 to the upper layer without waiting for receipt of d2. In addition, every data frame from D5 to D9, inclusive, has been received; these data frames can be passed to the upper layer.

The present invention solves both problems in Issue 1: (i) Since there is no specification as to the time period in which the transmitting station should switch back from the NormalAck scheme to the BlockAck scheme, the receiving station can know that an unreceived data frame is no longer valid only after a significant delay if the switchback takes time. (ii) Under the circumstances, the receiving station can pass successfully received subsequent data frames to the upper layer only after a significant delay.

Embodiment 2

Figure 2:
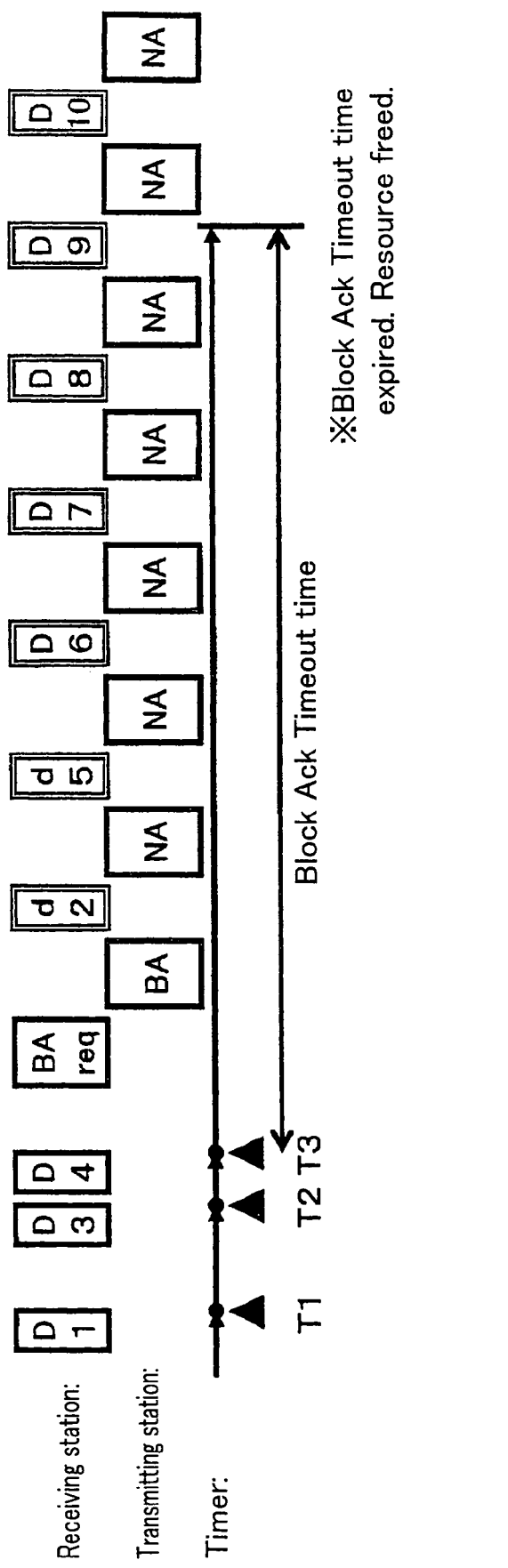
FIG. 2 is a timing diagram for a BlockAck Timeout detecting method implemented in a receiving station in accordance with embodiment 2 of the present invention.

Embodiment 2 of the present invention is an exemplary solution to Issue 2 by applying rule changes as in alternative rule 1. Embodiment 2 will be now described in reference to FIG. 2 and FIG. 14. FIG. 2 uses the same notation as FIG. 11 in relation to Issue 2. In addition, for convenience, members of the present embodiment that have the same arrangement and function as members of embodiment 1, and that are mentioned in that embodiment are indicated by the same reference numerals and description thereof is omitted.

Figure 14:
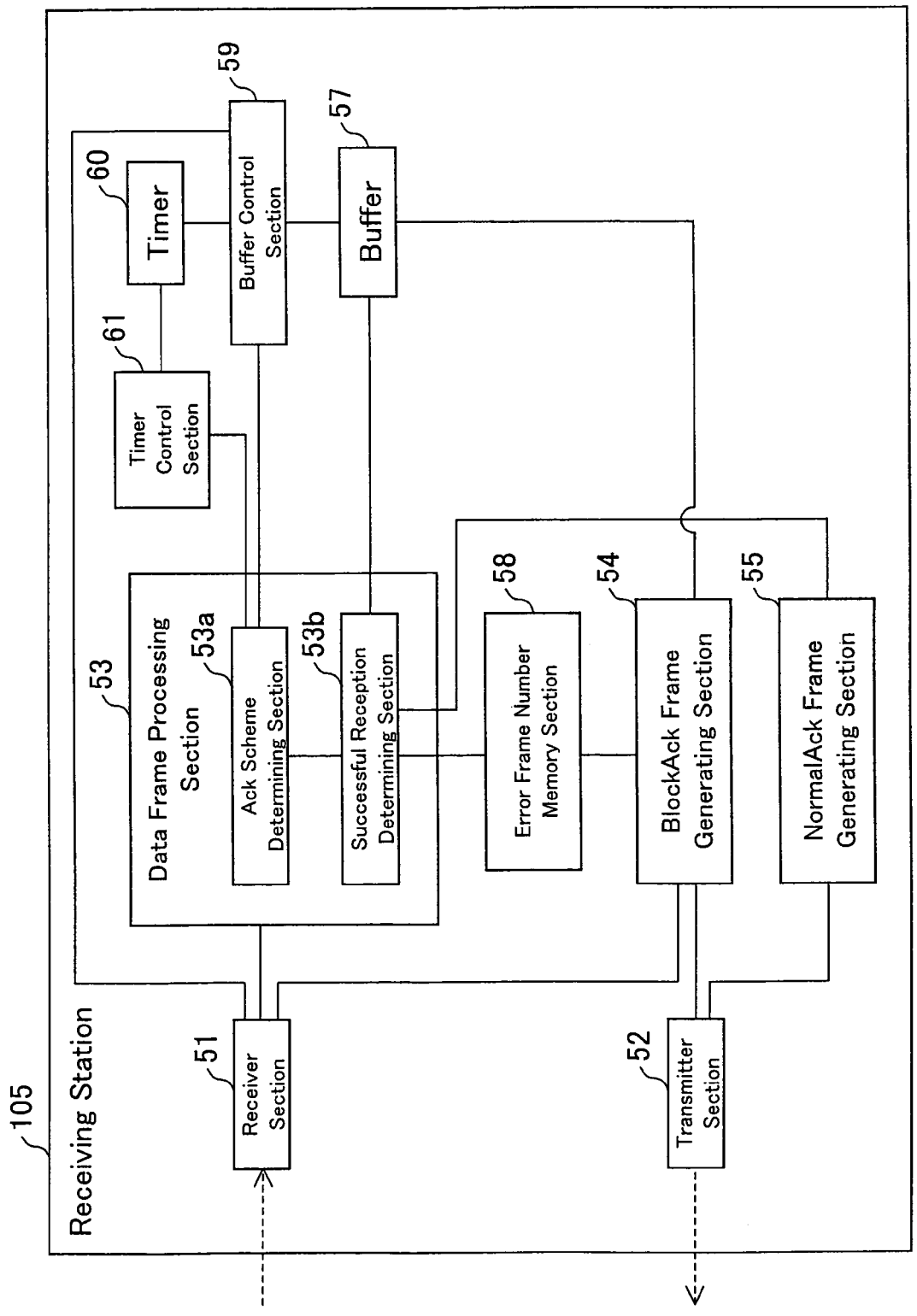
FIG. 14 is a block diagram illustrating the configuration of a receiving station in accordance with embodiment 2 of the present invention.

FIG. 14 is a block diagram illustrating the configuration of a receiving station 105 of the present embodiment. As shown in FIG. 14, the receiving station 105 includes a receiver section 51, a transmitter section 52, a data frame processing section 53, a BlockAck frame generating section 54, a NormalAck frame generating section 55, a buffer control section (resource control mechanism) 59, a timer 60, a timer control section (timer control mechanism) 61, a buffer 57, and an error frame number memory section 58.

The timer control section 61 controls resetting of the timer 60. The timer control section 61 obtains the Ack scheme specified in the data frame by the Ack scheme determining section 53a. The timer control section 61 resets the timer 60 if the obtained Ack scheme is the BlockAck scheme. In other words, upon receiving a data frame requesting the BlockAck scheme, the timer control section 61 resets the timer 60.

In addition to the functions of the buffer control section 56, the buffer control section 59 has another function to, when the timer 60 reaches the predetermined period provided by the BlockAck Timeout, regard the use of the BlockAck scheme as having terminated and release the resource in the buffer 57 used for the BlockAck scheme.

FIG. 2 shows an example where the BlockAck scheme is switched to the NormalAck scheme while frames are being transmitted in the BlockAck scheme.

Conventionally, the timer is reset every time a data frame is received regardless of what Ack Policy specifies. In the present embodiment, however, rules are changed according to alternative rule 1; the timer 60 is reset only when a data frame specifying the BlockAck scheme as the AckPolicy has been received. Therefore, the timer 60 is not reset after time T3 when the receiving station 105 receives the last data frame which specifies the BlockAck scheme as the AckPolicy. Thereafter, the timer 60 reaches the period of BlockAck Timeout. The receiving station detects that the use of the BlockAck scheme has ended and releases the resource.

Embodiment 3

Embodiment 3 of the present invention is an exemplary solution to Issue 2 by applying rule changes as in alternative rule 2.

The receiving station of the present embodiment is configured differently from that of embodiment 2 only in the functions of the timer control section 61. The timer control section 61 of the present embodiment resets the timer 60 only when the receiver section 51 has received a BlockAckReq frame.

Figure 11:
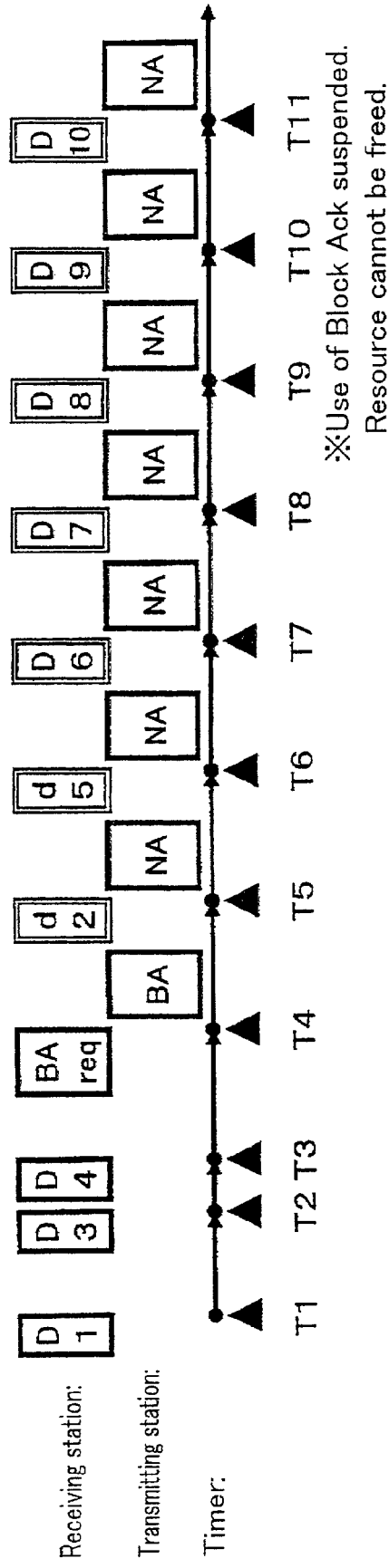
FIG. 11 is a timing diagram for a BlockAck Timeout detecting method implemented in a conventional receiving station.

Now, embodiment 3 will be described in reference to FIG. 3 which uses the same notation as FIG. 11 in relation to Issue 2.

Figure 3:
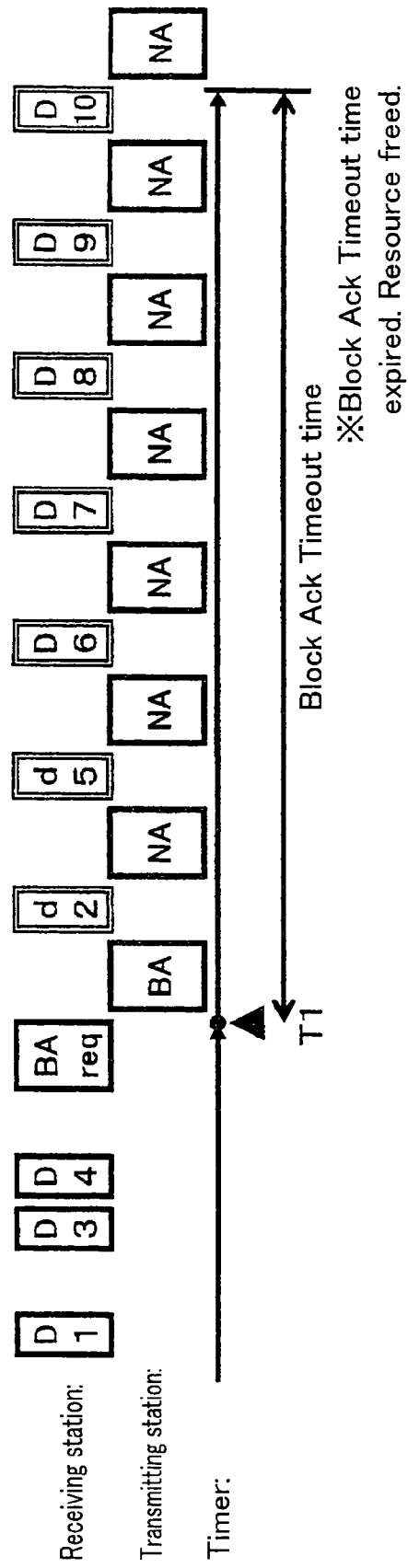
FIG. 3 is a timing diagram for a BlockAck Timeout detecting method implemented in a receiving station in accordance with embodiment 3 of the present invention.

FIG. 3 shows an example where the BlockAck scheme is switched to the NormalAck scheme while frames are being transmitted in the BlockAck scheme.

Conventionally, the timer is reset every time a data frame is received regardless of what Ack Policy specifies. In the present embodiment, however, rules are changed according to alternative rule 2; the timer is reset only when a BlockAckReq frame has been received. Therefore, the timer is not reset after time T1 when the receiving station receives the last BlockAckReq frame. Thereafter, the timer reaches the period of BlockAck Timeout. The receiving station detects that the use of the BlockAck scheme has ended and releases the resource.

Embodiment 4

Embodiment 4 of the present invention is an exemplary solution to Issue 2 by applying rule changes as in alternative rule 3.

The receiving station of the present embodiment is configured differently from those of embodiments 2 and 3 only in the functions of the timer control section 61. The timer control section 61 of the present embodiment resets the timer 60 when the receiver section 51 has received a data frame requesting the NormalAck scheme and when the receiver section 51 has received a BlockAckReq frame.

Now, embodiment 4 will be described in reference to FIG. 4 which uses the same notation as FIG. 11 in relation to Issue 2.

Figure 4:
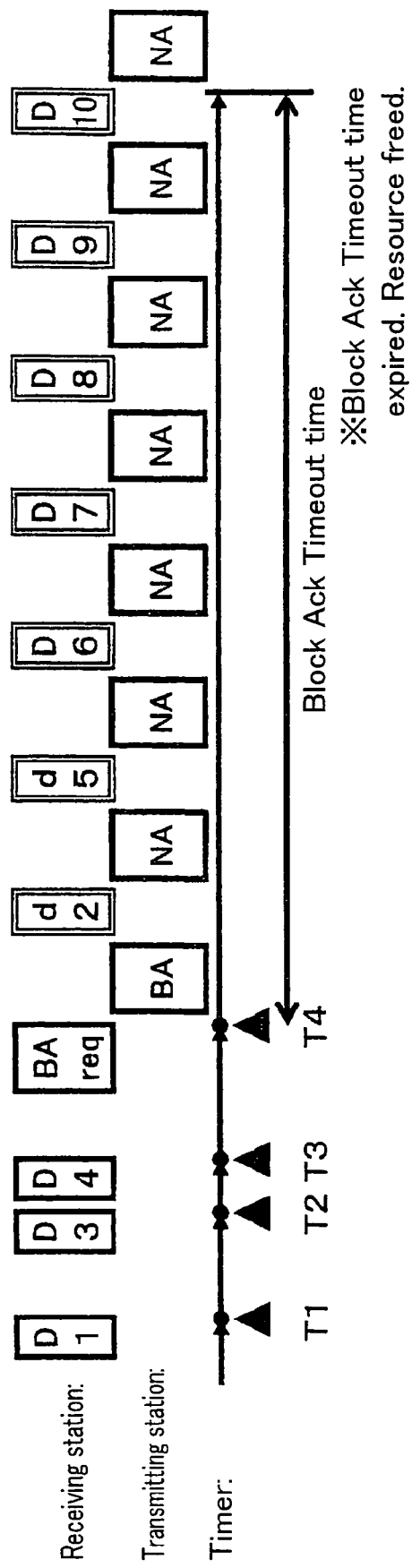
FIG. 4 is a timing diagram for a BlockAck Timeout detecting method implemented in a receiving station in accordance with embodiment 4 of the present invention.

FIG. 4 shows an example where the BlockAck scheme is switched to the NormalAck scheme while frames are being transmitted in the BlockAck scheme.

Conventionally, the timer is reset every time a data frame is received regardless of what Ack Policy specifies. In the present embodiment, however, rules are changed according to alternative rule 3; the timer is reset only when a data frame specifying the BlockAck scheme as the AckPolicy or a BlockAckReq frame has been received. Therefore, the timer is not reset after time T4 when the receiving station receives the last BlockAckReq frame. Thereafter, the timer reaches the period of BlockAck Timeout. The receiving station detects that the use of the BlockAck scheme has ended and releases the resource.

In this manner, the present invention solves the problems depicted as Issue 2: if the transmitting station has ended BlockAck-based data communications and switched to the NormalAck scheme, but without the receiving station correctly receiving, within a retransmission time limit, a message transmitted from the transmitting station to the receiving station indicating that the "BlockAck scheme will be ended," the receiving station fails to detect a timeout and cannot release the resource from the BlockAck scheme forever.

The members in the transmitting station 1 and the receiving stations 5, 105 and the process steps of the embodiments are realized by a CPU or other computing means executing a computer program contained in a ROM (Read Only Memory), a RAM, or other storage means to control a keyboard or other input means, a display or other output means, or an interface circuit or other communications means. Therefore, to realize the various functions and various processes of transmitting station 1 and the receiving station 5, 105 of the embodiments, a computer equipped with these means must only obtain a storage medium containing the computer program and executing it. In addition, a removable storage medium containing the computer program makes it possible to execute the various functions and processes on any computer.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

The embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

The present invention is applicable to a communications method enabling simultaneous use of both the NormalAck scheme whereby an acknowledgement for one frame is returned in one frame and the BlockAck scheme whereby acknowledgements for a plurality of frames are returned together in one frame. The present invention is applicable also to a transmitting station and a receiving station compliant with the communications method.

The invention claimed is:

1. A receiving station in compliance with a communications method capable of switching between a NormalAck scheme that includes an acknowledgement for a single frame in one frame and a BlockAck scheme that includes an acknowledgement for a plurality of frames in one frame in the receiving station returning an Acknowledgement for a received data frame, the receiving station comprising:
   a resource; and
   a controller controlling the resource to release when the receiving station receives a message to terminate the BlockAck scheme from a transmitting station, wherein:
   the receiving station, if not having received a data frame requesting the BlockAck scheme within a predetermined period regardless of whether the receiving station has or has not received a data frame requesting the NormalAck scheme, regards use of the BlockAck scheme as having been terminated and releases resource being used for the BlockAck scheme.

2. A communications method allowing a receiving station to switch between a NormalAck scheme that includes an acknowledgement for a single frame in one frame and a BlockAck scheme that includes an acknowledgement for a plurality of frames in one frame in returning an Acknowledgement for a received data frame, said communications method comprising:
   releasing a resource when a message to terminate the BlockAck scheme is received, wherein:
   the receiving station, if not having received a data frame requesting the BlockAck scheme within a predetermined period regardless of whether the receiving station has or has not received a data frame requesting the NormalAck scheme, regards use of the BlockAck scheme as having been terminated and releases resource being used for the BlockAck scheme.

3. A computer-readable storage medium having instructions stored thereon, said instructions are read and executed by a processor for causing the processor to perform the communications method of claim 2.

4. A receiving station in compliance with a communications method capable of switching between a NormalAck scheme that includes an acknowledgement for a single frame in one frame and a BlockAck scheme that includes an acknowledgement for a plurality of frames in one frame in the receiving station returning an Acknowledgement for a received data frame, the receiving station comprising:
   a resource; and
   a controller controlling the resource to release when the receiving station receives a message to terminate the BlockAck scheme from a transmitting station, wherein:
   the receiving station, if not having received a BlockAck request frame within a predetermined period regardless of whether the receiving station has or has not received a data frame, regards use of the BlockAck scheme as having been terminated and releases resource being used for the BlockAck scheme.

5. A communications method allowing a receiving station to switch between a NormalAck scheme that includes an acknowledgement for a single frame in one frame and a BlockAck scheme that includes an acknowledgement for a plurality of frames in one frame in returning an Acknowledgement for a received data frame, said communications method comprising:
   releasing a resource when a message to terminate the BlockAck scheme is received, wherein:
   the receiving station, if not having received a BlockAck request frame within a predetermined period regardless of whether the receiving station has or has not received a data frame, regards use of BlockAck scheme as having been terminated and releases resource being used for the BlockAck scheme.

6. A computer-readable storage medium having instructions stored thereon, said instructions are read and executed by a processor for causing the processor to perform the communications method of claim 5.

7. A receiving station in compliance with a communications method capable of switching between a NormalAck scheme that includes an acknowledgement for a single frame in one frame and a BlockAck scheme that includes an acknowledgement for a plurality of frames in one frame in the receiving station returning an Acknowledgement for a received data frame, the receiving station comprising:
   a resource; and
   a controller controlling the resource to release when the receiving station receives a message to terminate the BlockAck scheme from a transmitting station, wherein:
   the receiving station, if not having received a data frame requesting the BlockAck scheme or a BlockAck request frame within a predetermined period regardless of whether the receiving station has or has not received a data frame, regards use of BlockAck scheme as having been terminated and releases resource being used for the BlockAck scheme.

8. A communications method allowing a receiving station to switch between a NormalAck scheme that includes an acknowledgement for a single frame in one frame and a BlockAck scheme that includes an acknowledgement for a plurality of frames in one frame in returning an Acknowledgement for a received data frame, said communications method comprising:
   releasing a resource when a message to terminate the BlockAck scheme is received, wherein:
   the receiving station, if not having received a data frame requesting the BlockAck scheme or a BlockAck request frame within a predetermined period regardless of whether the receiving station has or has not received a data frame, regards use of the BlockAck scheme as having been terminated and releases resource being used for the BlockAck scheme.

9. A computer-readable storage medium having instructions stored thereon, said instructions are read and executed by a processor for causing the processor to perform the communications method of claim 8.

10. A communications method switching between a NormalAck scheme that includes an acknowledgement for a single frame in one frame and a BlockAck scheme that includes an acknowledgement for a plurality of frames in one frame, said communications method comprising:
    releasing a resource when a message to terminate the BlockAck scheme is received, wherein:
    a receiving station of a stream of a traffic identifier, if not having received a Quality of Service (QoS) data frame including an Acknowledgement Policy field containing information indicating the BlockAck within the period of BlockAck Timeout regardless of whether the receiving station has or has not received a QoS data frame including an Acknowledgement Policy field containing information indicating the NormalAck, regards use of BlockAck scheme as having been terminated, and releasing resource being used for transmission of the BlockAck.

11. A computer-readable storage medium having instructions stored thereon, said instructions are read and executed by a processor for causing the processor to perform the communications method of claim 10.

12. A communications method switching between a NormalAck scheme that includes an acknowledgement for a single frame in one frame and a BlockAck scheme that includes an acknowledgement for a plurality of frames in one frame said communications method comprising:

releasing a resource when a message to terminate the BlockAck scheme is received, wherein:

a receiving station of a stream of a traffic identifier, if not having received a Block Acknowledgement Request Frame within the period of BlockAck Timeout regardless of whether the receiving station has or has not received a Quality of Service data frame, regards use of BlockAck scheme as having been terminated, and releases resource being used for transmission of the BlockAck.

13. A computer-readable storage medium having instructions stored thereon, said instructions are read and executed by a processor for causing the processor to perform the communications method of claim 12.

14. A communications method switching between a NormalAck scheme that includes an acknowledgement for a single frame in one frame and a BlockAck scheme that includes an acknowledgement for a plurality of frames in one frame, said communications method comprising:

releasing a resource when a message to terminate the BlockAck scheme is received, wherein:

a receiving station of a stream of a traffic identifier, if not having received a Quality of Service (QoS) data frame including an Acknowledgement Policy field containing information indicating a BlockAck or a Block Acknowledgement Request Frame within the period of BlockAck Timeout regardless of whether the receiving station has or has not received a QoS data frame including an Acknowledgement Policy field containing information indicating a NormalAck, regards use of BlockAck scheme as having been terminated, and releases resource being used for transmission of the BlockAck.

15. A computer-readable storage medium having instructions stored thereon, said instructions are read and executed by a processor for causing the processor to perform the communications method of claim 14.

16. A receiving station capable of switching between a NormalAck scheme that includes an acknowledgement for a single frame in one frame and a BlockAck scheme that includes an acknowledgement for a plurality of frames in one frame in returning an Acknowledgement for a received data frame, said receiving station comprising:

a resource
   a controller controlling the resource to release when the receiving station receives a message to terminate the BlockAck scheme from a transmitting station, wherein:
   a timer;
   a timer control mechanism for resetting the timer upon receiving at least one of a data frame requesting the BlockAck scheme and a BlockAck request frame within a predetermined period; and
   a resource control mechanism for regarding use of the BlockAck scheme as having been terminated and releasing resource being used for the BlockAck scheme when the timer has reaches a predetermined period.

* * * * *